US012614119B2

(12) United States Patent　　　　　(10) Patent No.:　US 12,614,119 B2
Turlica et al.　　　　　　　　　　　　　(45) Date of Patent:　Apr. 28, 2026

(54) PROPAGATING AUTHORED PACKAGES TO ASSET MANAGEMENT PLATFORMS

(71) Applicant: MAINTAINX INC., Miami, FL (US)

(72) Inventors: Stefan Cristian Turlica, Miami, FL (US); Hugo Dozois-Caouette, Miami, FL (US); Mathieu Marengère-Gosselin, Montreal (CA)

(73) Assignee: MaintainX Inc., Miami, FL (US)

( * ) Notice: Subject to any disclaimer, the term of this patent is extended or adjusted under 35 U.S.C. 154(b) by 0 days.

(21) Appl. No.: 19/057,448

(22) Filed: Feb. 19, 2025

(65) Prior Publication Data

US 2025/0190879 A1　　　Jun. 12, 2025

Related U.S. Application Data

(63) Continuation-in-part of application No. 18/236,288, filed on Aug. 21, 2023.

(51) Int. Cl.
　　*G06N 20/00*　　　　(2019.01)
　　*G06V 30/10*　　　　(2022.01)
(52) U.S. Cl.
　　CPC .............　*G06N 20/00* (2019.01); *G06V 30/10* (2022.01)
(58) Field of Classification Search
　　CPC ........... G06N 20/00; G06V 30/10; G06F 8/65
　　See application file for complete search history.

(56) References Cited

U.S. PATENT DOCUMENTS

| 11,200,045 B1 | 12/2021 | Moyal et al. |
| 2016/0282847 A1 | 9/2016 | Germann et al. |

| 2021/0158174 A1 | 5/2021 | Deluca et al. | |
| 2022/0083926 A1 | 3/2022 | Miller et al. | |
| 2022/0237509 A1* | 7/2022 | Courtney ................. | G06N 7/01 |
| 2023/0072516 A1* | 3/2023 | Belkin ................. | G06K 7/1413 |
| 2023/0214703 A1* | 7/2023 | Maheswari ............ | G06N 3/088 700/291 |
| 2023/0266733 A1 | 8/2023 | Chillar et al. | |
| 2023/0274049 A1 | 8/2023 | Perumalla et al. | |
| 2024/0176732 A1* | 5/2024 | Hans ....................... | G06F 9/451 |

FOREIGN PATENT DOCUMENTS

WO　　WO-2023194857 A1 *　10/2023　............. E21C 41/26

OTHER PUBLICATIONS

International Search Report and Written Opinion received for PCT Patent Application No. PCT/US2024/042288, mailed on Sep. 12, 2024, 16 pages.

* cited by examiner

*Primary Examiner* — Brent Johnston Hoover
(74) *Attorney, Agent, or Firm* — Van Pelt, Yi & James LLP

(57)　　　　　　　　ABSTRACT

Techniques for using an LLM agent to predict a state of an asset are disclosed. The LLM agent uses bitemporal modeling to track status information of an asset. The status information includes an uptime or a downtime of the asset. The LLM agent is trained to detect anomalies with respect to at least one of the uptime or the downtime of the asset and to predict uptimes and downtimes. The LLM agent generates a prediction regarding a future uptime or a future downtime of the asset. Subsequently, the LLM agent collects data reflecting an actual uptime or an actual downtime of the asset during the given range of time. The LLM agent makes a comparison between the prediction and the actual data and then further trains or instructs the LLM agent based on this comparison.

21 Claims, 17 Drawing Sheets

Camera
805

Supply
800

Image Data
810

1500

1505   Acquire Information Describing An Asset

1510   Generate A Digital Twin For The Asset

1515   Receive A Package That Is Associated With The Asset

1520   Transmit The Package

1525   Receive Telemetry Data That Indicates Operational Conditions Associated With The Asset 1530   Use The Telemetry Data To Determine Compliance With The Governing Criteria Of The Package

1500

1535 — Receive An Update To The Package Such That An Updated Package Is Received 1540 — Transmit The Updated Package 1545 — Surface A User Option To Accept, Reject, Or Postpone A Portion Of The Updated Package

PROPAGATING AUTHORED PACKAGES TO ASSET MANAGEMENT PLATFORMS

CROSS-REFERENCE TO RELATED APPLICATIONS

This application is a Continuation-In-Part of U.S. patent application Ser. No. 18/236,288 filed on Aug. 21, 2023, entitled "PROPAGATING AUTHORED PACKAGES TO ASSET MANAGEMENT PLATFORMS," which application is expressly incorporated herein by reference in its entirety.

BACKGROUND

The phrase "software distribution" generally refers to the process of propagating programs, program updates, or other types of program packages to an end user of the program. As an example, a set of developers may design an application. Once the application is designed, the application is distributed or rolled out to end users who may then use the application. Often, new updates to the application may be developed. These updates can be similarly distributed to users of the application. By distributing or propagating software packages, end users can enjoy the benefits of an up-to-date application.

A "large language model" (LLM) is a specialized type of machine learning (ML) or artificial intelligence (AI) model that has been trained on a large set of data. The data can be of any type, though it is often text-based data. Image data, video data, and other data types can also be used. With its training, the LLM is able to understand and produce output that resembles human-generated output. As various examples, an LLM can be tasked with translating input from one language (e.g., perhaps English) to another language (e.g., perhaps Spanish). LLMs can be tasked with answering questions, writing code, analyzing language patterns, and writing creative content. LLMs can be involved with an "agent."

An "agent" is a type of system or service that leverages one or more LLMs to perform a task. Notably, an agent is a type of autonomous system that can "think" and act on its own; meaning, it can operate without specific instructions from a user. An LLM will respond to a question if asked. For instance, if an LLM is asked: "What is the price of a plane ticket to Machu Pichu?" the LLM can generate a response. An agent, on the other hand, can not only provide a response, but it can also go about scheduling and paying for the flight. The agent can also book a hotel and vehicular travel arrangements.

An agent operates on top of an LLM in that the agent can use the LLM to complete its tasks. An agent also includes memory and tools or functionality. Using its memory, the agent can recall information from past sessions. Using its tools, the agent can facilitate the completion of tasks, such as the scheduling service mentioned above. Agents can have access to external databases, application programming interfaces (API), or any other utility. At its highest level of description, however, an agent can be viewed as being an executable service or component having access to an LLM that operates at the core of the agent. The LLM helps to process information and to assist in deciding what decisions will be taken by the agent. Additional memory, action-taking skills, or tools can be plugged into the agent to further expand its functionality. Agents are becoming a revolutionary technology in almost every domain.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for using a machine learning (ML) model (e.g., an LLM agent) to predict a state of an asset, the method including: using bitemporal modeling to track status information of an asset, wherein the status information includes at least one of an uptime or a downtime of the asset, and wherein the bitemporal modeling provides records detailing a current state of the asset's status information and records that are navigable to detail previous states of the asset's status information at a selected point in time; feeding the tracked status information used by the bitemporal modeling to an ML model, wherein the ML model, during a first training stage, is trained to detect anomalies with respect to at least one of the uptime or the downtime of the asset and to generate predictions regarding uptimes and downtimes; causing the ML model to generate a prediction regarding a future uptime or a future downtime of the asset, the future uptime or the future downtime being predicted for a given range of time that is to subsequently transpire; subsequently, collecting data reflecting an actual uptime or an actual downtime of the asset during the given range of time; comparing the ML model's prediction of the future uptime or the future downtime of the asset with the data reflecting the actual uptime or the actual downtime of the asset during the given range of time; and further training the ML model based on said comparison, such that the ML model is subjected to a second training stage to correct for discrepancies between the ML model's prediction of the future uptime or the future downtime of the asset and the data reflecting the actual uptime or the actual downtime of the asset.

In some aspects, the techniques described herein relate to a computer system that uses a machine learning (ML) model (e.g., an LLM agent) to predict a state of an asset, the computer system including: a processor system; and a storage system that stores instructions that are executable by the processor system to cause the computer system to: use bitemporal modeling to track status information of an asset, wherein the status information includes at least one of an uptime or a downtime of the asset, and wherein the bitemporal modeling provides records detailing a current state of the asset's status information and records that are navigable to detail previous states of the asset's status information at a selected point in time; feed the tracked status information used by the bitemporal modeling to an ML model, wherein the ML model, during a first training stage, is trained to detect anomalies with respect to at least one of the uptime or the downtime of the asset; cause the ML model to generate a prediction regarding a future uptime or a future downtime of the asset, the future uptime or the future downtime being predicted for a given range of time that is to subsequently transpire; subsequently, collect data reflecting an actual uptime or an actual downtime of the asset during the given range of time; compare the ML model's prediction of the future uptime or the future downtime of the asset with the data reflecting the actual uptime or the actual downtime of the asset during the given range of time; and further train the ML model based on said comparison, such that the ML model is subjected to a second training stage to correct for discrepancies between the ML model's prediction of the future uptime or the future downtime of the asset and the data reflecting the actual uptime or the actual downtime of the asset.

In some aspects, the techniques described herein relate to a method for using a machine learning (ML) model (e.g., an LLM agent) to predict a state of an asset, the method including: using bitemporal modeling to track status information of an asset, wherein the status information includes at least one of an uptime or a downtime of the asset, and wherein the bitemporal modeling provides records detailing a current state of the asset's status information and records that are navigable to detail previous states of the asset's status information at a selected point in time; feeding the tracked status information used by the bitemporal modeling to an ML model, wherein the ML model, during a first training stage, is trained to detect anomalies with respect to at least one of the uptime or the downtime of the asset; causing the ML model to generate a prediction regarding a future uptime or a future downtime of the asset, the future uptime or the future downtime being predicted for a given range of time that is to subsequently transpire; subsequently during the given range of time, collecting data reflecting an actual uptime or an actual downtime of the asset during the given range of time, wherein the collected data includes sensor data obtained for the asset; comparing the ML model's prediction of the future uptime or the future downtime of the asset with the data reflecting the actual uptime or the actual downtime of the asset during the given range of time, wherein said comparing is performed using a chart that identifies deviations between the actual uptime or the actual downtime and the predicted further uptime or the predicted further downtime; and further training the ML model based on said comparison, such that the ML model is subjected to a second training stage to correct for the deviations between the ML model's prediction of the future uptime or the future downtime of the asset and the data reflecting the actual uptime or the actual downtime of the asset.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Many industries, such as the manufacturing industry, rely on different assets (e.g., units of equipment) to operate. As various examples, these units may include conveyor belts, climate control systems (e.g., HVAC), pressurized equipment, and so on. It is often mission critical for consumers that their equipment operates correctly, predictably, and safely.

Figure 1:
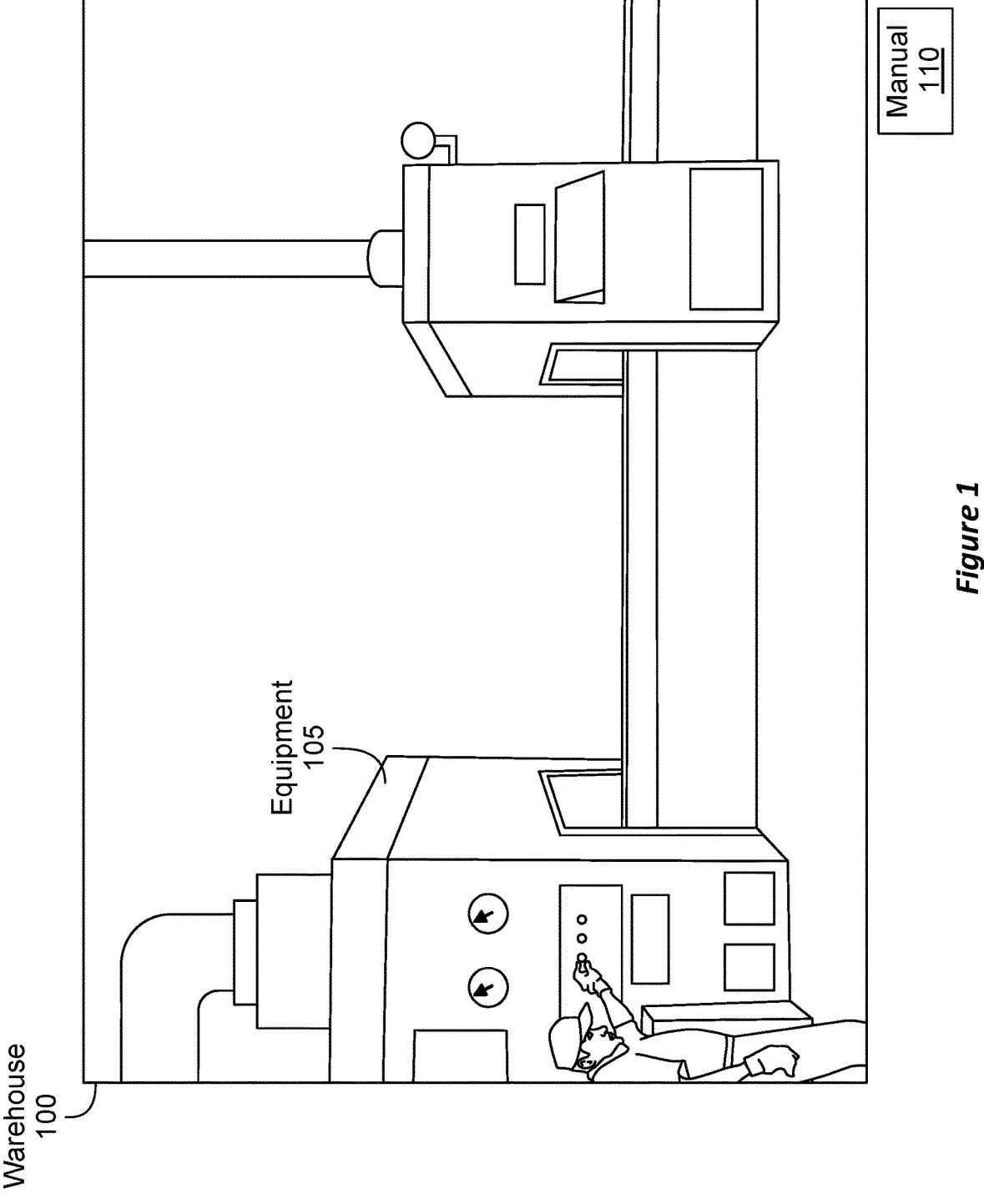
FIG. 1 illustrates an example scenario involving an asset in the form of equipment.

To help ensure that the equipment operates as intended, the manufacturers of the equipment typically provide the consumer with user or maintenance guides. These guides often come in the form of large binders of paper detailing all of the instructions related to a unit of equipment. FIG. 1 is illustrative.

FIG. 1 shows a warehouse 100 that includes a unit of equipment 105. A manual 110 is typically provided to a technician operating the equipment 105. The manual 110 details how to use and service the equipment 105. The manual 110 also often details the inventory of parts for the equipment 105, including potentially how to obtain spare parts. In some cases, the manual 110 may include a vendor list detailing which vendors are able to provide which parts. The manual 110 also often includes maintenance schedules for the equipment 105 and how to troubleshoot failures.

Historically, it has been very challenging to search through the manual 110 to find out how to resolve issues. As mentioned earlier, it is often the case that the manual 110 is a binder comprising a large number of paper documents. Searching through such a binder is often a challenge. Also, it is often the case that the manual 110 is periodically updated by the manufacturer of the equipment. Updating the manual 110 also results in challenges when it is presented in this traditional format.

These historical practices are also quite reactive in their design. For instance, preventative care on equipment is often overlooked because such care is often buried in the large expanse of the manual 110, and consumers of the equipment (e.g., technicians or other users) are often not aware of some of the preventative measures they should take.

Another issue that has plagued the traditional technology is that manufacturers are often unable to track their fleet of equipment. Once the equipment leaves the manufacturer, it is often the case that manufacturers are no longer able to help in establishing maintenance schedules or in assisting in finding spare parts.

Stated differently, physical hardware has historically been distributed along with paper documentation detailing how the hardware works, how to operate the hardware, how to maintain the hardware, and how to troubleshoot issues. In some cases, information will also be provided regarding vendors that can service the hardware and how to obtain spare parts.

As a specific example, consider an espresso machine. The instruction manual for this unit will detail how to set it up for the first time. Then, indications on cadence, parts and procedures required to descale it will also be provided. It is likely that a guide on how to interpret error codes or what physical latches to examine will be provided. Lastly, a list of approved vendors might also be provided to service the equipment and/or to install spare parts.

In the industrial space, it is often the case that more advanced and expensive equipment are used. Because of the cost of obtaining a new unit, it is often desirable to maximize an existing unit's efficiency and lifetime as well as to minimize its downtime. Yet, the paradigm of setting up the equipment, maintaining it, troubleshooting it, and eventually upgrading it is strikingly similar to the one in the consumer space in that almost everything is managed via paper.

That being said, all of these processes are magnified in their scope for the industrial space. For instance, the documentation for an industrial unit often comes in the form of a large paper binder that is inches thick and that attempts to handle every possible scenario around maintenance (both preventive and reactive). Consumers are provided a vast sea of information that is easy to get lost in. When updates occur, the manual often needs to be reprinted, updated, or otherwise patched to account for new changes or adjustments.

What often happens is that consumers end up failing to properly maintain their units, thereby potentially reducing that unit's optimal lifetime and potentially costing millions of dollars for early replacements. If the unit goes down, it can take much longer to troubleshoot and repair, which in turn can also represent large financial losses for the consumer.

Moreover, the equipment manufacturer has little-to-no visibility over how their equipment is used (or misused) across their customer base. Manufacturers often cannot anticipate or detect chronic issues or defects before they cause downtime or injuries. Manufacturers also cannot use this as an efficient channel to service the equipment "just in time" or to replace or upgrade parts strategically.

Finally, regulating bodies, such as OSHA (Occupational Safety and Health Administration), are also mostly left in the dark. They are not able to monitor all the equipment usage in all facilities all of the time.

What is needed, therefore, is an improved technique for managing assets (e.g., equipment) in a manner that is actionable as opposed to reactionary. What is further needed is a technique for enabling manufacturers to better track their fleet of equipment. In effect, there is a substantial need to connect consumers and manufacturers so that these two entities can better manage and maintain various assets. The disclosed embodiments are designed to satisfy these needs as well as many others.

In view of the above problems, it has been observed that there are various parallels between hardware and software. For example, both require an initial setup, instructions to operate, instructions to troubleshoot, and procedures to account for updates. Both can be regulated by external bodies. Both can be used as a building blocks in a bigger component (e.g., a compressor in an HVAC can be likened to a library used to compress images in a photo editor). Individual pieces of equipment can be building blocks for an even bigger component, such as a factory.

With that observation, it is purported that hardware can be serviced in a similar way as software is serviced using such concepts as proper methodology, proper toolkits, correct paradigms, and improved mentality. Software is notorious for receiving frequent updates, covering things such as security, performance, and feature revisions. Software is often composed of other software and libraries, which in turn can also receive frequent updates. Software also frequently reports metrics through anonymous telemetry to a code developer. This telemetry data is then used to analyze crashes, defects, usage, and other activities. That information can be very valuable to educate what issues to address first, what patterns to avoid in the future, which ones to double down on, and even what to build next. The disclosed embodiments are able to manage hardware in a manner that is similar to how software is managed.

In this regard, the disclosed embodiments provide numerous benefits, advantages, and practical applications to at least the technical field of asset management. Such improvements are achieved by managing hardware assets in a dynamic and flexible manner, similar to how software assets are managed.

As one example, the embodiments beneficially provide a centralized service that is able to receive authored packages from manufacturers and propagate those packages to consumers of the asset. These packages include information related to an asset such as procedures for the asset, vendor lists for the asset, parts for the asset, or any other information related to maintaining, operating, or troubleshooting the asset. These packages can be updated and distributed in real time, without the severe latency that was involved in traditional practices.

Similar to how software systems are deployed and maintained, the disclosed embodiments employ related principles for the care and management of physical assets, such as equipment. As an example, an initial version of a manual may be deployed. When updates to that manual are authored by the manufacturer, the disclosed service is able to receive those updates and then propagate them to the various consumers who have the corresponding asset. The disclosed service is further able to operate in conjunction with existing asset management tools to receive up-to-date information about the various units of equipment being used by each consumer. The service can receive and maintain this information and can optionally even provide it to the manufacturer. Using this received information (e.g., telemetry data), the manufacturer can then better track the states of the equipment in their fleet. Thus, a two-way update process occurs; with information being supplied from the OEM to the customer and with other information being supplied from the customer to the OEM.

Beneficially, information for an asset (e.g., an equipment manual) can now be updated in real time. The various procedures, preventative care, and maintenance can also beneficially be updated in real time. As another benefit, the disclosed service is able to receive feedback from consumers tasked with using the disclosed information. That feedback can then be used to facilitate further updates, if so desired. As one example, it may be the case that a technician is performing actions defined in an updated manual. The technician may discover a slight improvement in how the operations are performed, so the technician may provide this feedback to the service. A new update package can then be authored based on the feedback provided from the technician.

In this regard, the disclosed solutions beneficially aim to allow hardware manufacturers to deploy, update, and monitor their equipment horizontally to all their customers in a manner similar to how software is maintained. To achieve this objective, the disclosed embodiments are directed to a package authoring and delivery system that enables operations related to defining and regrouping the various components used for the proper deployment and servicing of hardware assets. Examples of such components include, but are not limited to, assets, parts, vendors, sensors, procedures (such as standard operating procedures, maintenance and troubleshooting instructions, regulatory compliance, etc.), and work order templates (e.g., preventive maintenance, corrective actions, pre-configured recommendations).

Using these solutions, when hardware manufacturer's customer has a new piece of hardware installed, rather than a cumbersome paper binder, the hardware's information is now delivered as a software package that can be installed in the customer's preferred environment (e.g., an asset management platform). Installing the software package can be as easy as scanning a QR code on the hardware, a URL, or any other selectable link. Beneficially, one way in which the package operates is that each component inside the package points to an origin symbol (e.g., procedure or other data) that can be referenced by all installed versions. This allows for a multitude of benefits, including selectivity, overriding, composition, update management, logging and monitoring, and eventually contributing. Accordingly, these and many other benefits and improvements will now be discussed in more detail throughout the remaining portions of this disclosure.

Figure 2:
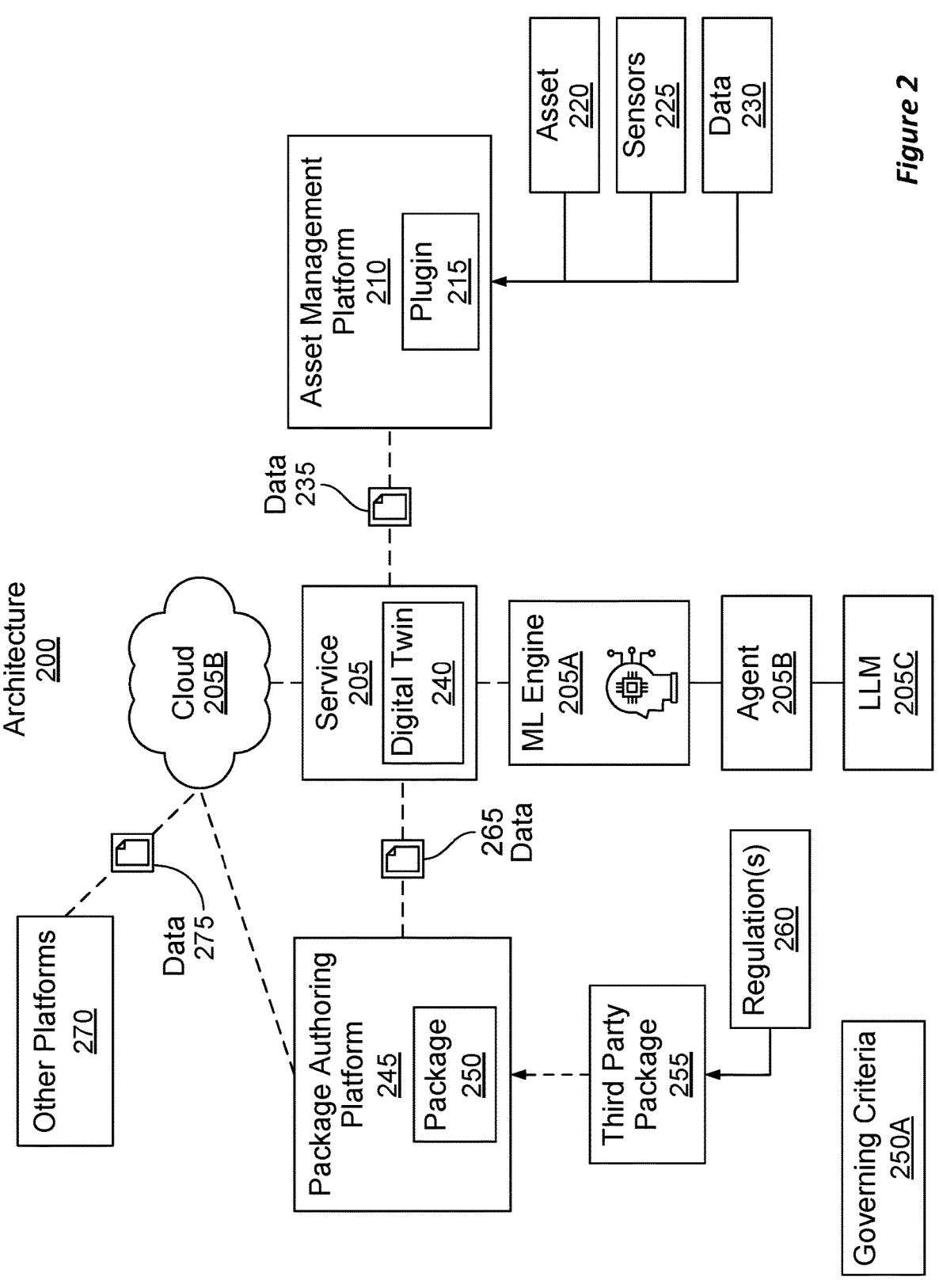
FIG. 2 illustrates an example architecture for authoring, transmitting or propagating, and implementing an authored package.

Having just described a few example benefits, attention will now be directed to FIG. 2, which illustrates an example architecture 200 that can be used to achieve those benefits. Initially, architecture 200 is shown as including a service 205.

As used herein, the term "service" refers to an automated program that is tasked with performing different actions based on input. In some cases, service 205 can be a deterministic service that operates fully given a set of inputs and without a randomization factor. In other cases, service 205 can be or can include a machine learning (ML) or artificial intelligence engine, such as ML engine 205A. ML engine 205A enables service 205 to operate even when faced with a randomization factor. The ML engine 205 can include an LLM agent 205B, which utilizes a large language model (LLM) 205C of any type, including any type of generative pre-trained transformers (GPT). Optionally, the disclosed service 205 can operate as the LLM agent 205B.

The LLM agent 205B is authored based on a definition. The "definition" of an agent refers to code indicating what an agent is tasked with doing. For instance, the definition of the agent can be that the agent is tasked with propagating a package and then facilitating or assisting in the download and implementation of that package at a client device. Thus, the agent is able to perform operations beyond those of normal LLMs because the agent can automatically and without user instruction facilitate the download and installation of a package at a remote device. It should be especially noted how any of the disclosed operations recited herein can be performed by the LLM agent 205B, which may be trained and subsequently retained to improve its performance and operations.

As used herein, reference to any type of machine learning, large language model, agent, or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 205 is a cloud service operating in a cloud environment 205B. In some implementations, service 205 is a local service operating on a local device. In some implementations, service 205 is a hybrid service that includes a cloud component operating in the cloud environment 205B and a local component operating on a local device. These two components can communicate with one another.

Service 205 communicates with an asset management platform 210 used by a consumer of an asset. To do so, a plugin 215 is often installed in the asset management platform 210, and the plugin 215 is used to facilitate the communications between service 205 and the asset management platform 210. Stated differently, in some scenarios, the asset management platform 210 includes a plugin 215 component that facilitates communications between the asset management platform 210 and the service 205, and the service 205 may be a cloud service.

Figure 3:
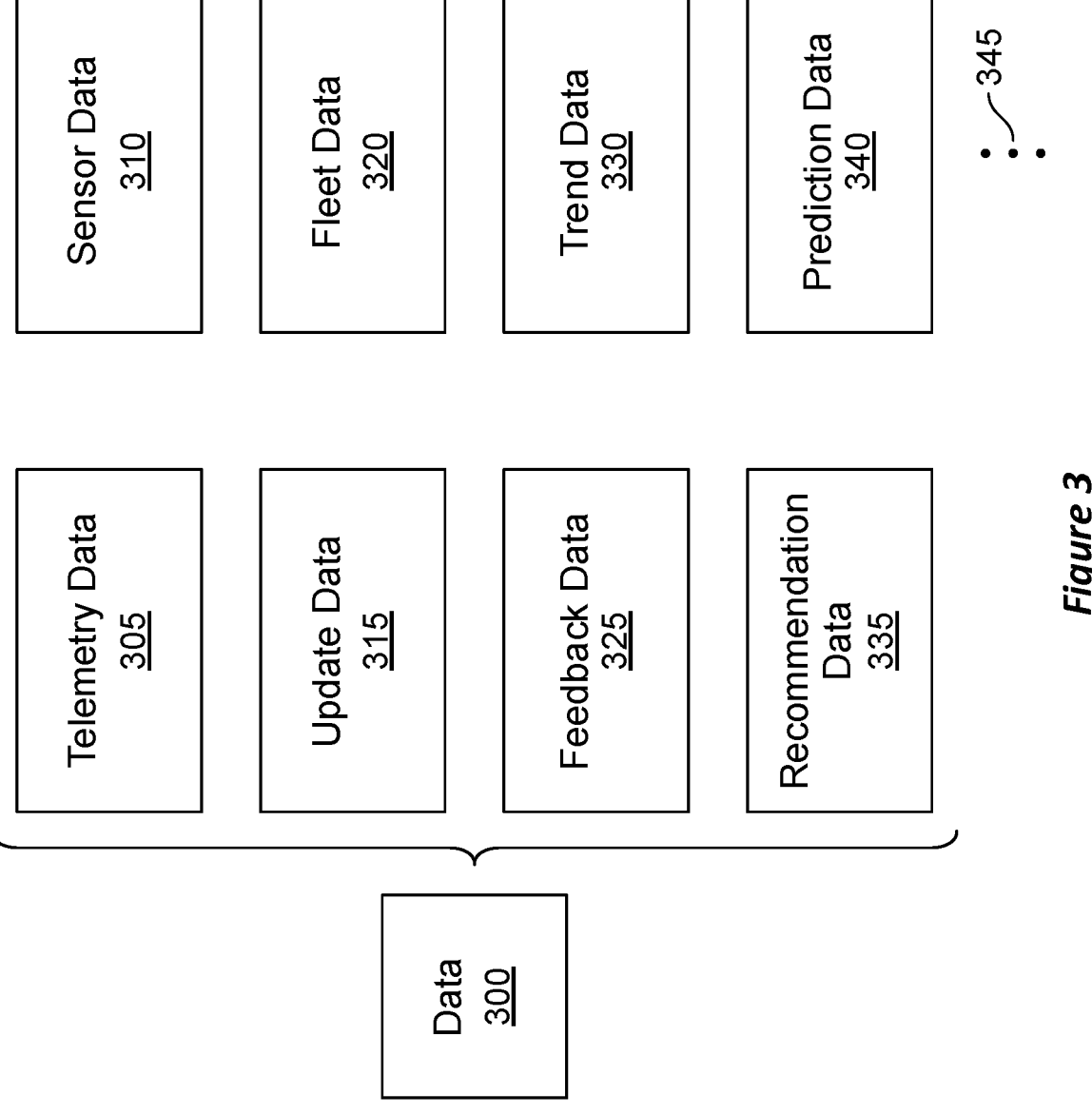
FIG. 3 illustrates various examples of data describing an asset.

Generally, the asset management platform 210 is a tool, service, application, or any other type of platform used by asset consumers to manage their assets, such as asset 220. In some cases, the asset management platform 210 is able to acquire sensor data from sensors 225 that are monitoring the asset 220. In some cases, any other type of data 230 can be obtained by the asset management platform 210 for the asset 220. The asset management platform 210 acquires this data and is then able to transmit it to the service 205, as shown by data 235. FIG. 3 provides some additional details regarding the data 235. The embodiments, particularly the LLM agent, can capture, process, log, monitor, alert, and/or trigger certain actions based on machine-read data that is read from sensors in an industrial environment. The sensors may include any type of sensor. Optionally, the sensors can include Internet of Things (IoT) sensors. The LLM agent can attend to asynchronously or synchronously obtaining any type of sensor data and then acting upon that data to make inferences and subsequent decisions, even without user involvement or instruction. For instance, if the LLM agent detects a discrepancy in terms of sensor pattern data, the LLM agent can investigate as to the potential cause for this discrepancy. The LLM agent can then attempt to resolve the discrepancy.

FIG. 3 shows data 300, which is representative of the data 235 from FIG. 2. Data 300 can include data sent from a consumer to the service or from the service to the consumer. Examples of data 300 include, but are not limited to, any type of telemetry data 305, sensor data 310, update data 315, fleet data 320, feedback data 325, trend data 330, recommendation data 335, or prediction data 340. The ellipsis 345 demonstrates how other data may be included as well.

The telemetry data 305 refers to data describing the operational characteristics of an asset. Such characteristics may include run time, down time, service time, output produced, maintenance times, inspections, flags and failures, labor time, repair costs, part costs, any other costs, and so on.

The sensor data 310 refers to data obtained from sensors that are tasked with monitoring the conditions associated with the asset. Such data may include the environmental conditions in which the asset is operating, the internal conditions of the asset (e.g., temperature, pressure, etc.), or any other type of sensor data.

The update data 315 refers to data describing how or when a package for an asset was authored, is updated, or will subsequently be updated. Notably, the package can include any type of information about an asset. In some cases, the package includes the asset's manual, or a digital twin of the manual. In some cases, the package purposefully omits the manual because the package already includes the details from the manual, but those details are in a different format (e.g., perhaps in the format of a standard operating procedure, or a parts list, or a vendor list). Thus, in some cases, the disclosed service analyzes the package and analyzes the manual. The service is able to identify redundant or duplicate material and selectively determine whether to include that redundant material in the package or exclude it from the package. The disclosed package may thus include any content from the asset's manual as well as additional information, such as, but not limited to, standard operating procedures (SOPs), parts maintenance schedules, spare parts, and/or vendor information. The package can be authored by an original equipment manufacturer (OEM), and the package may be periodically updated. The authored package and the updates can be transmitted to a customer. Thus, the described package can be viewed as being a bundle of information that is delivered, such as over a network, to a customer. The authoring and update of a package can occur without a dependency on which clients have an asset. Rather, after the package is authored or updated, the disclosed service can identify which clients have the asset and then deliver the package or the update. Therefore, in accordance with the disclosed principles, the embodiments are able to maintain an authored package and are able to update the package in real time. Accordingly, the update data 315 may include updates from the manufacturer for the authored package.

The fleet data 320 refers to data describing which manufacturer's fleet an asset may be included in. For instance, a particular manufacturer may deploy many units of the same type of equipment to many different consumers. The fleet data 320 can describe to which fleet a consumer's asset belongs. In some cases, the manufacturer may transmit data to the consumers to describe various conditions associated with a fleet of equipment.

The feedback data 325 refers to data generated at the consumer end. Technicians or other workers may be tasked with performing various actions. Inasmuch as those workers are closest to the asset, it is often the case that those workers identify or derive improved processes for operating on or with those assets. The workers can then provide feedback data 325 to the manufacturers, and that feedback data may trigger the update of a manual, such as perhaps a service manual.

The trend data 330 refers to data describing various behavioral trends identified for an asset or a group of assets. As an example, a manufacturer can acquire fleet data describing operational characteristics of a particular type of asset. That data can be analyzed to detect patterns or trends in behavior, thereby producing the trend data 330. It may be advantageous for consumers to be apprised of this trend data 330; thus, the trend data 330 can be sent to the consumers.

Recommendation data 335 refers to various recommendations that may be generated by one or more of the consumer or the manufacturer. This data can be used to update practices and other procedures.

Prediction data 340 refers to data that has been generated and that relates to a prediction as to how an asset may subsequently operate. For instance, the prediction data 340 may predict that a particular part of an asset will likely expire within an upcoming time period, and so that part should be pre-ordered and be ready to be replaced.

Returning to FIG. 2, the data 235 is transmitted from the asset management platform 210 to the service 205. Using that data 235, service 205 is able to generate a so-called "digital twin" 240 of the asset 220. As used herein, the phrase "digital twin" generally refers to a digital representation of an asset. As an example, if the asset is a piece of equipment, the digital twin can include a digital representation of that asset. In some cases, the digital twin may include a computer generated representation of the size shape and physical characteristics of the asset, such as a model of the asset. The digital twin 240 may further include operational characteristics of the asset as well as potentially a physical location of the object, including perhaps its proximity to other objects in an environment. The digital twin 240 may include additional metadata or descriptive information about the asset as well, such as the manual for the asset and/or any of the other information described herein. The embodiments can also include functionality to perform resource planning and resource allocation. For instance, the embodiments can help plan the hours of a technician. The embodiments can also balance workloads to accommodate a mixture of reactive and recurring workloads or tasks based on set schedules. As mentioned earlier, the disclosed LLM agent can attend to any of these operations.

Figure 4:
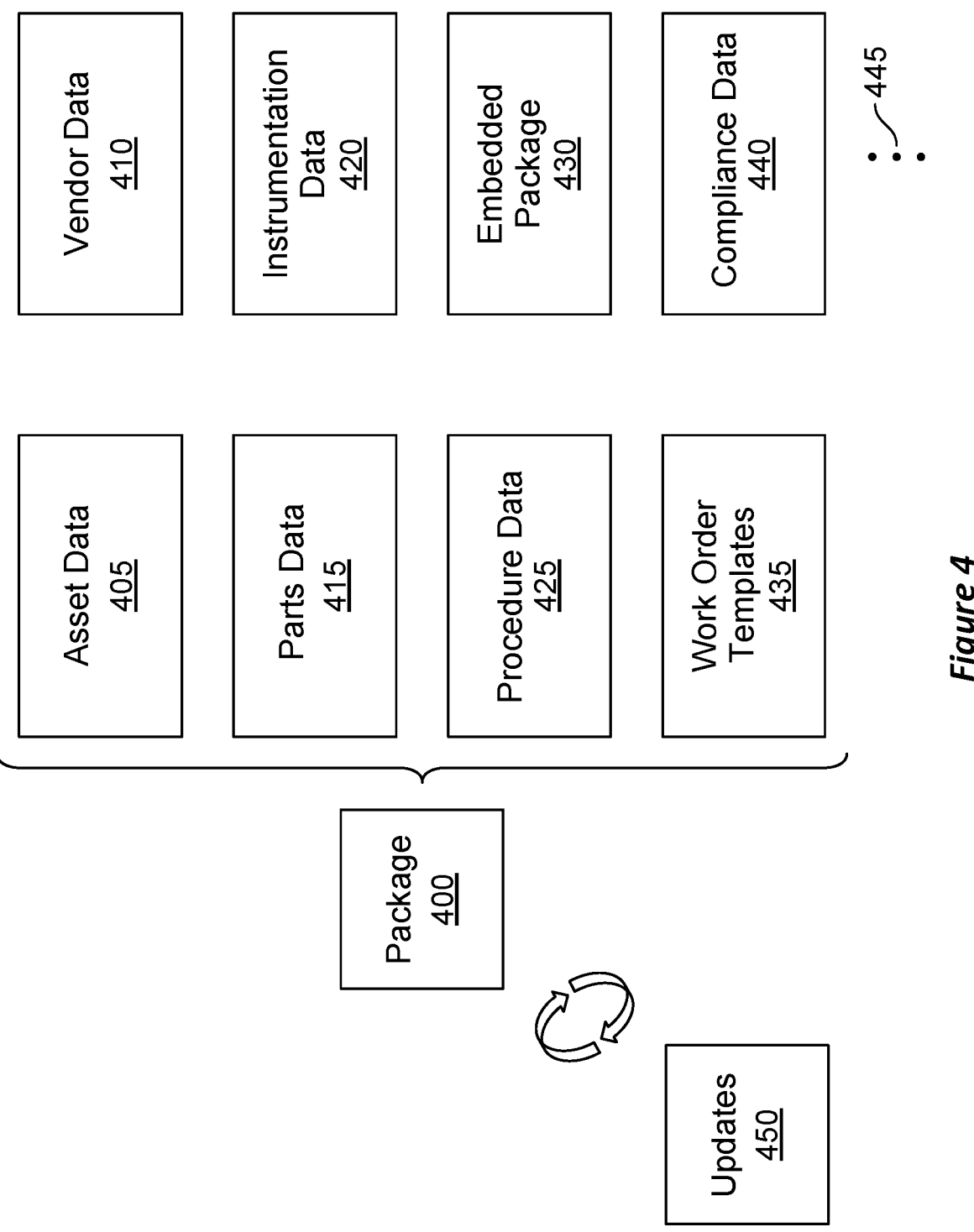
FIG. 4 illustrates various examples of data describing a package.

FIG. 2 also shows how service 205 is able to communicate with a package authoring platform 245. Often, this package authoring platform 245 belongs to or is otherwise associated with a manufacturer of an asset, such as an original equipment manufacturer (OEM). The platform 245 provides a framework or tool to enable developers to author a package 250 that can be transmitted to the asset management platform 210. Package 250 outlines a set of governing criteria 250A for the asset 220. FIG. 4 provides further details regarding the package 250.

FIG. 4 shows a package 400, which is representative of package 250 from FIG. 2. Package 400 may include, but is not limited to, data that includes any one or more of the following: asset data 405, vendor data 410, parts data 415, instrumentation data 420, procedure data 425, embedded package 430, work order templates 435, or compliance data 440. The ellipsis 445 demonstrates how other information or data can be included in the package 400 as well.

Asset data 405 refers to any data about an asset. Such data can include how it operates, where it operates, when it operates, weight, size, and so on. Vendor data 410 refers to any data about vendors who can service the asset. Parts data

Figure 5:
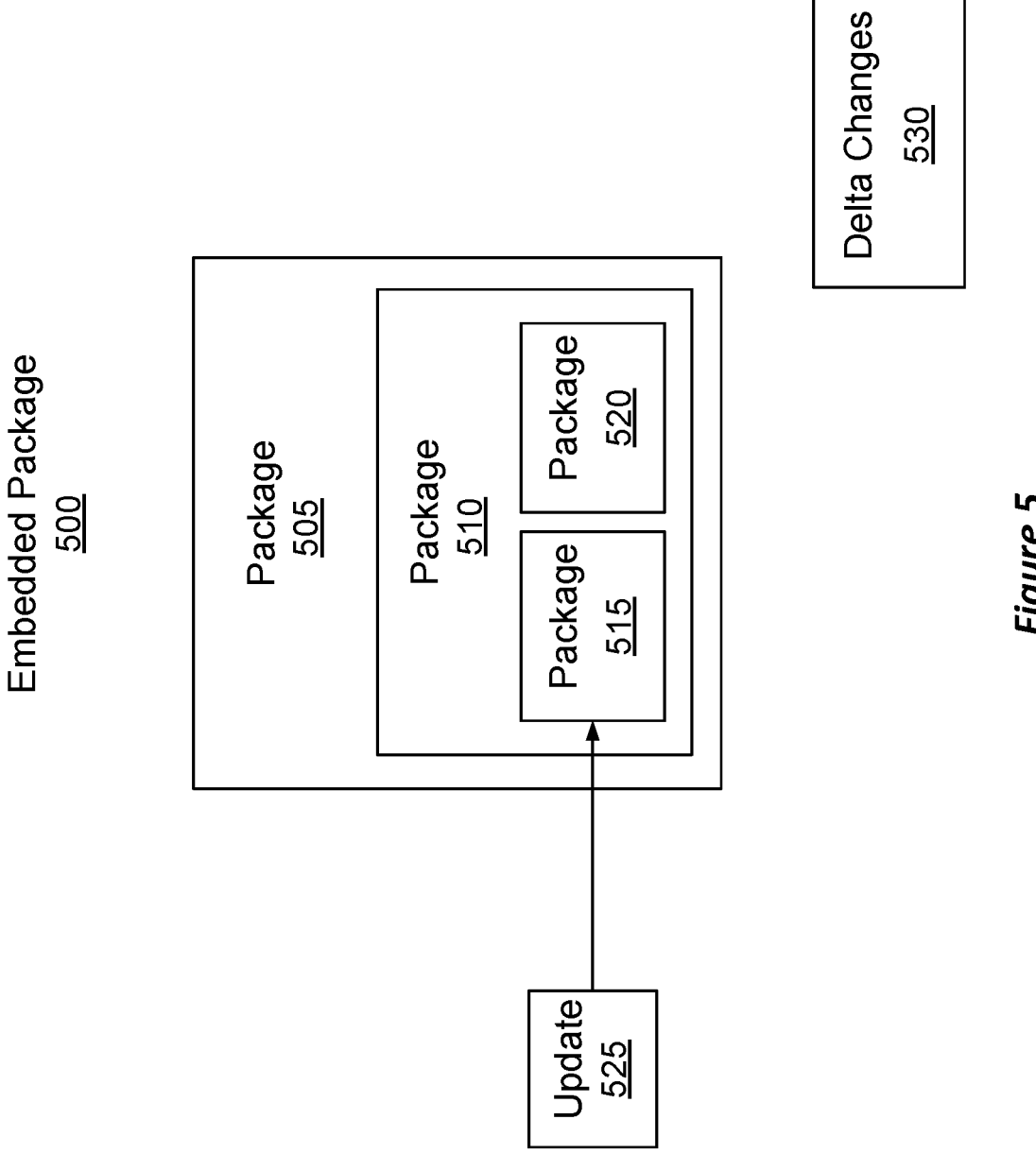
FIG. 5 illustrates an example of an embedded package.

415 refers to any data about parts that the asset may use. Instrumentation data 420 refers to any data about sensors or other instrumentation associated with the asset, including data generated by those sensors. Procedure data 425 refers to any data describing procedures for the asset. Embedded package 430 refers to a package that has at least one other packaged embedded inside of it. FIG. 5 is illustrative.

For example, FIG. 5 shows an embedded package 500, which is representative of embedded package 430 from FIG. 4. Embedded package 500 is shown as including a first package 505. Embedded inside of package 505 is another package 510. Embedded inside of package 510 are two other packages, such as package 515 and package 520. The embodiments are able to provide updates to the entire embedded package 500 and/or to individual packages embedded inside of another package, as shown by update 525. Furthermore, the embodiments are able to track the specific changes that are made and to log these changes in an audit log. Delta changes 530 refers to the specific changes or deltas that exist between one version of a package and an updated version of that package.

An example of an embedded package will be helpful. Package 505 may be a package that is developed by a manufacturer of an asset. Often, certain assets are regulated by a governing authority. These governing authorities may have a set of guidelines or requirements that certain assets are to meet. Those requirements may be included in a package that is authored by the governing authority. The package 505 may thus include another package authored by a different entity (e.g., the governing authority). For instance, package 510 may be the package authored by the governing authority. Thus, a package may include any number of embedded other packages, and those other packages may be authored by different entities.

Returning to FIG. 4, work order templates 435 refers to templates that may be generated for an asset. Finally, compliance data 440 refers to compliance requirements an asset may need to abide by.

An initial package may be authored and transmitted to the asset management platform. Later, various updates 450 may be made, and those updates 450 can likewise be transmitted.

Returning to FIG. 2, package authoring platform 245 is able to provide a framework for authoring the package 250. Additionally, or alternatively, a package can be authored by a third-party and provided to the platform 245, as shown by third party package 255. In some cases, this third party package 255 may include specialized details regarding specific regulation(s) 260 for an asset. That third party package 255 can optionally be embedded in another package or it can eventually be delivered to the asset management platform 210 as is.

In any event, the platform 245 is able to transmit its packages to the service 205. Data 265 represents the authored package being delivered to the service 205.

Architecture 200 may further include or may communicate with any number of other platforms 270, such as platforms associated with other OEMs. These other platforms 270 are similarly able to transmit data 275 to the service 205. Furthermore, all of these units of data can be used to analyze trends in fleet data.

As another benefit, service 205 is able to generate a corpus of data that describes the various assets and how they are being used. Overtime, service 205 (and in particular the ML engine 205A) is able to identify trends and patterns and help facilitate the production of updated packages to be sent to the asset management platform 210. These packages include updated information on how to operate, maintain, or otherwise use the asset 220.

Figure 6:
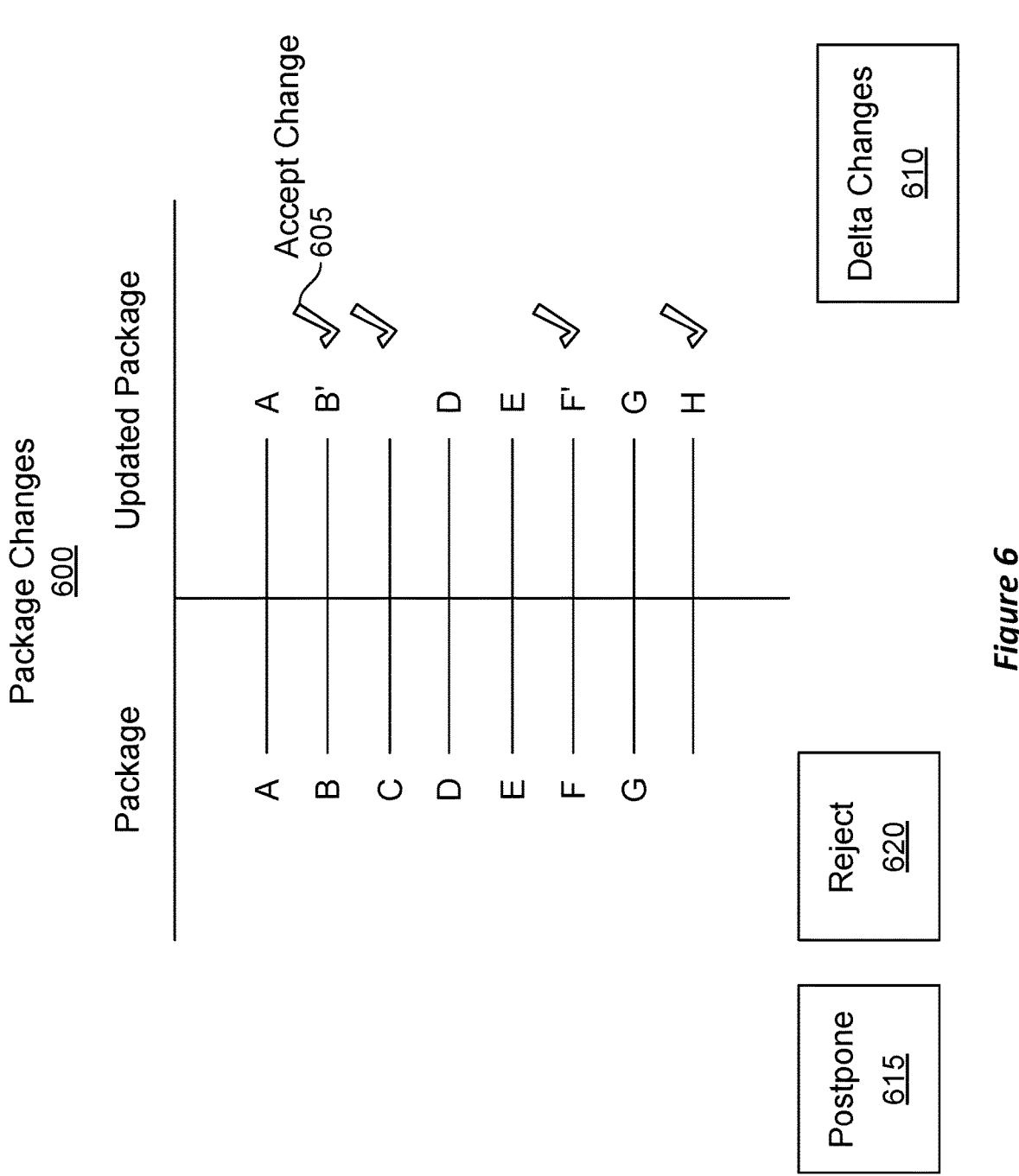
FIG. 6 illustrates an example of an option to accept, reject, or postpone updates to a package.

FIG. 6 shows an example scenario in which deltas or package changes 600 can be tracked and transmitted to a consumer for review and/or approval for incorporation into that consumer's asset. For example, FIG. 6 shows a first version of a package (listed under the label "package") and an updated version of that package (listed under the label "updated package").

The original package include features A, B, C, D, E, F, and G. The updated package includes features A, B', D, E, F', G, and H. This updated package can be transmitted to a consumer to review and/or accept the updates. For instance, in FIG. 6, the checkmarks next to line items 2, 3, 6, and 8 (corresponding to original features B, C, F, and newly added H) indicate that the consumer has accepted the updates, as shown by accept change 605.

In some instances, the consumer can elect to postpone 615 the incorporation of a new set of updates. In other instances, the consumer can elect to reject 620 the new updates. In yet other scenarios, the consumer can elect to accept the new updates. In any event, the consumer is made aware of the delta changes 610 that exist between one version of a package and an updated version of that package.

Figure 7:
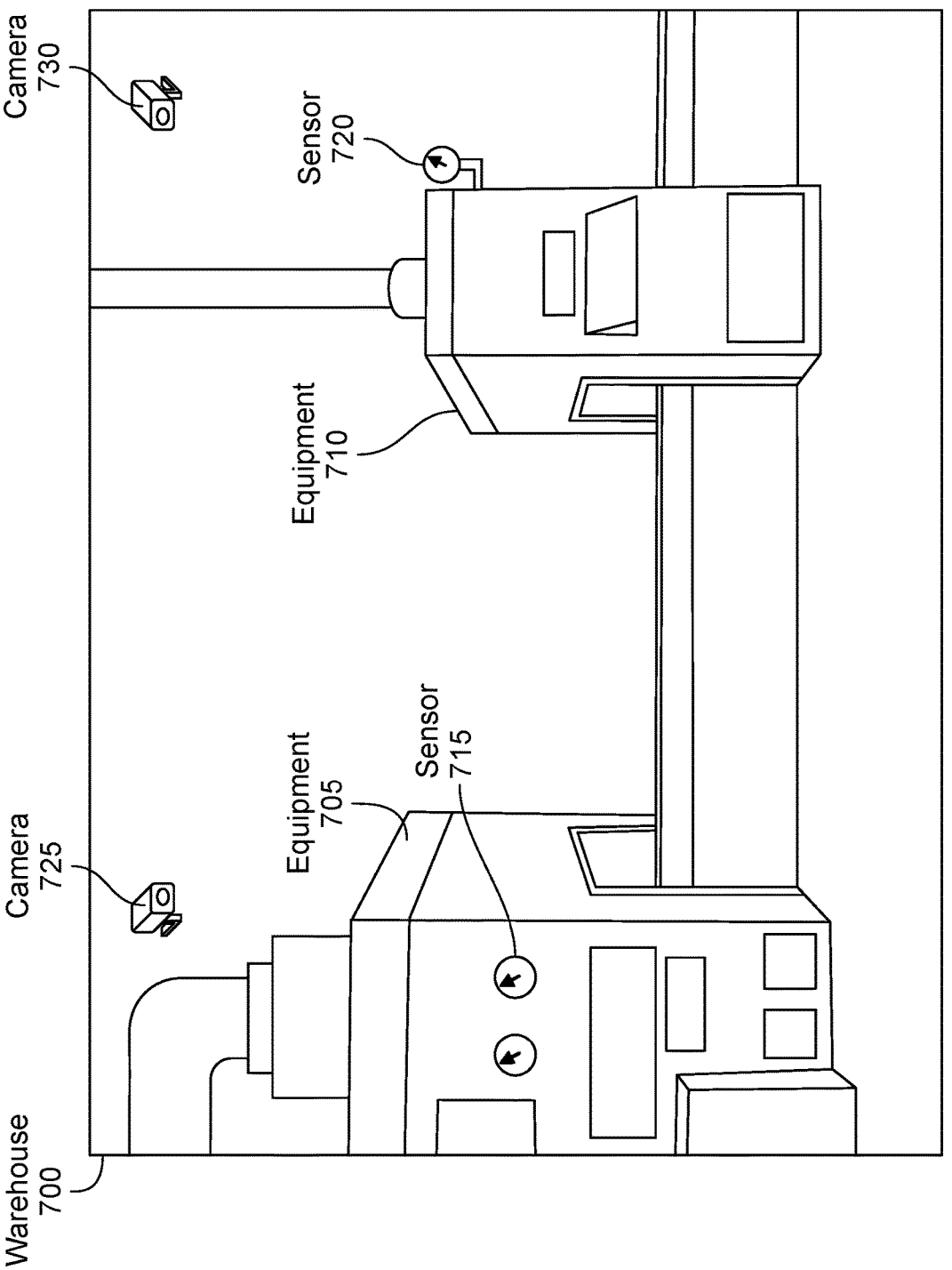
FIG. 7 illustrates various assets and sensors.

FIGS. 7 through 12 illustrate various example scenarios in which sensor data and other types of data are being used by the disclosed embodiments. FIG. 7 shows an example warehouse 700 that includes multiple units of equipment, such as equipment 705 and equipment 710 (i.e. assets). Warehouse 700 also includes multiple sensors, such as sensor 715, sensor 720, camera 725, and camera 730. These various sensors and equipment are being managed by the asset management platform 210 of FIG. 2. For instance, the equipment 705 and 710 can be included as assets (e.g., asset 220 of FIG. 2) tracked by the asset management platform 210. Similarly, the sensors 715 and 720 and cameras 725 and 730 can be included among the sensors 225 of FIG. 2.

Figure 8:
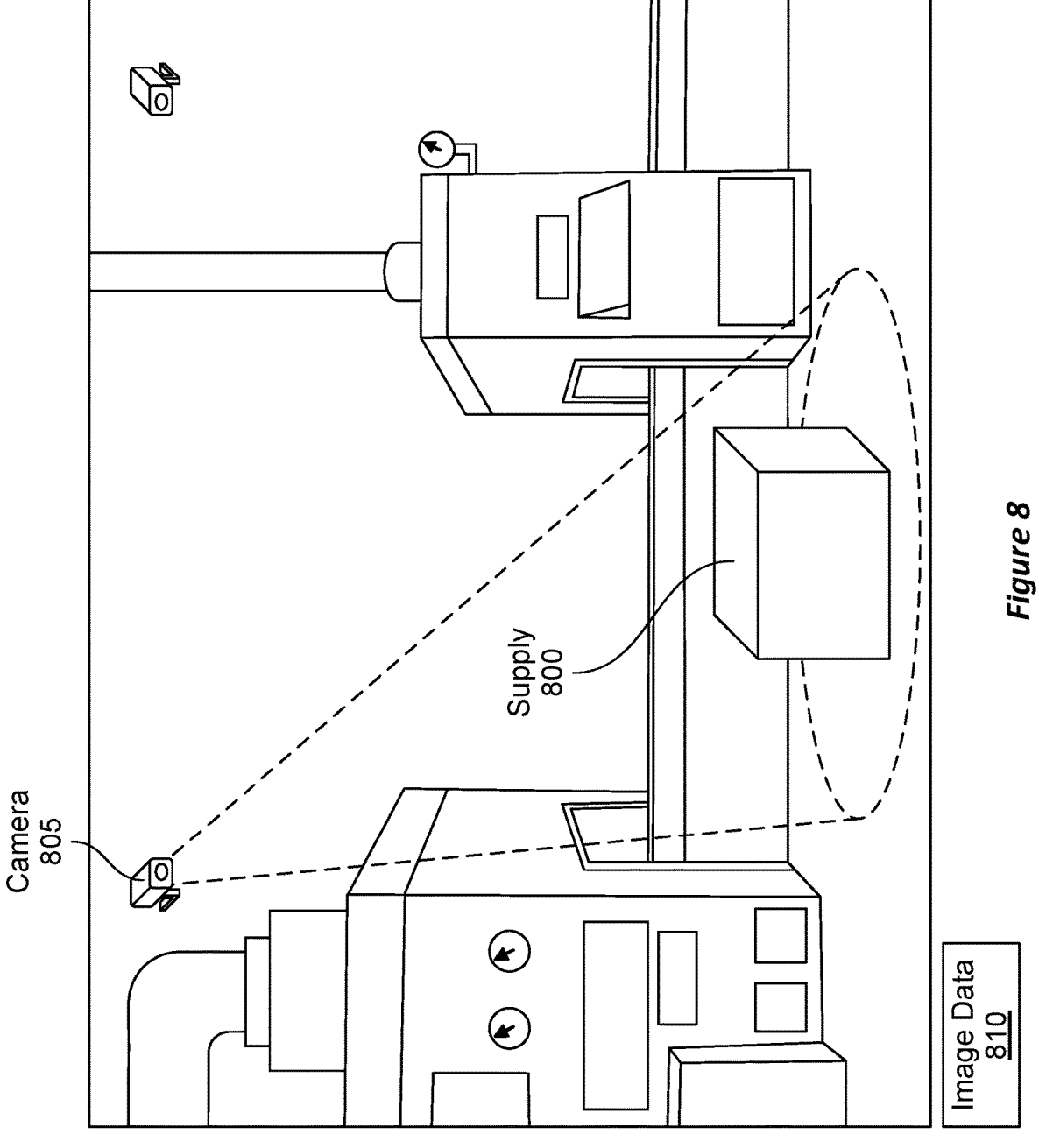
FIG. 8 illustrates how a sensor can monitor various conditions for an asset.

FIG. 8 shows an example of a supply 800 that is used by any of the equipment mentioned earlier. In this example scenario, camera 805 is generating image data 810 about the supply 800.

Figure 9:
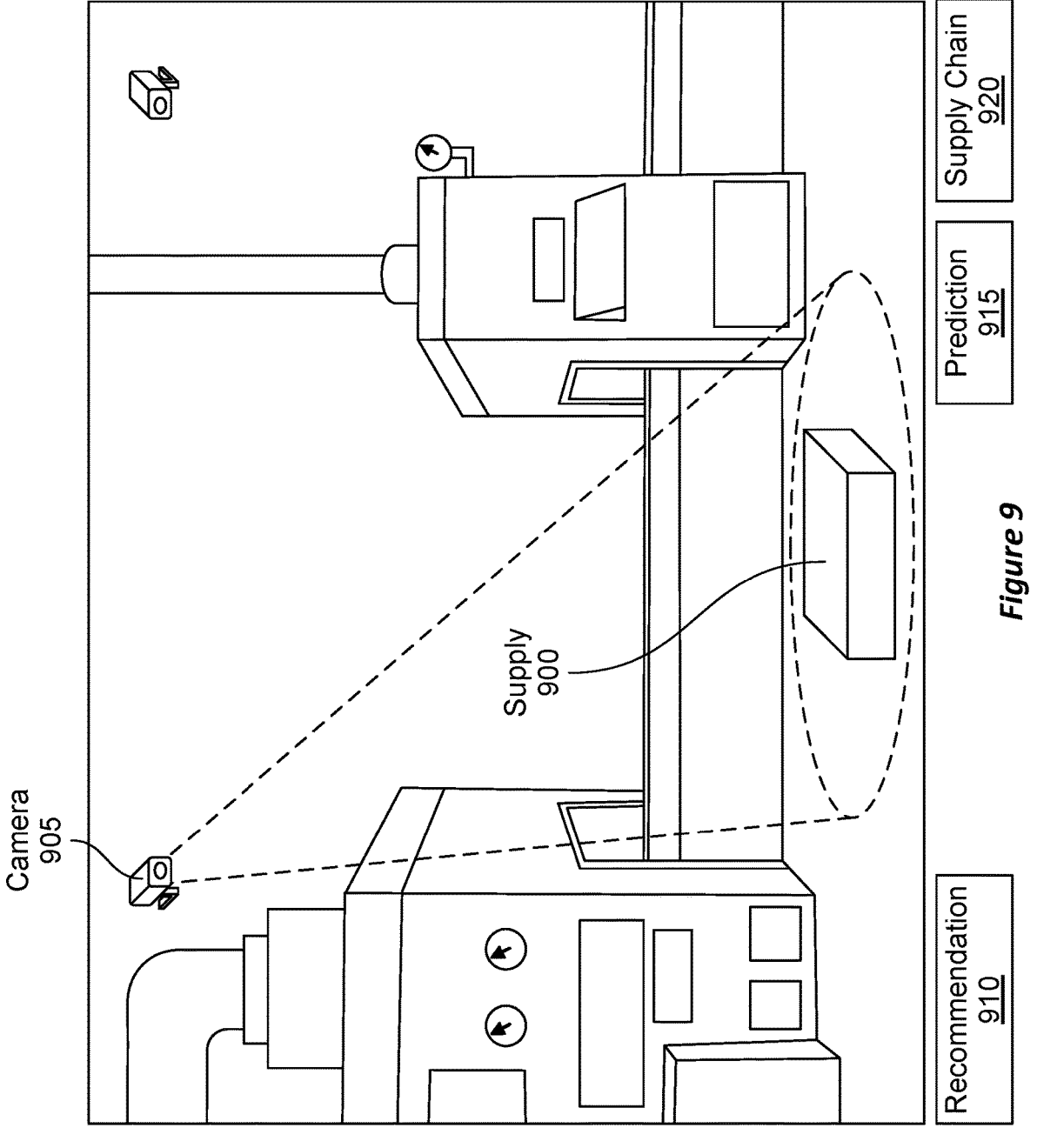
FIG. 9 illustrates another scenario where a sensor is monitoring conditions.

FIG. 9 shows a scenario where the supply 900 is now lower than supply 800 of FIG. 8. Here, camera 905 has been tracking the supply 900. The resulting image data can be transmitted to the service 205 of FIG. 2. Service 205 can analyze the sensor data to generate a recommendation 910 or a prediction 915 with respect to the supply chain 920 for that supply 900. For instance, based on the monitored levels of the supply 900, service 205 may predict that the supply 900 will run out by a certain date. Similarly, service 205 may generate a recommendation that more of the supply 900 should be obtained prior to that date so that the equipment can continue to operate.

While the above example focused on a scenario involving the analysis of image data to generate a prediction and a recommendation, one will appreciate how any type of sensor data can be used. Indeed, any type of measurement or sensor data can be used. In some cases, the analysis of that data may be performed by the ML engine mentioned earlier. As a specific example, the ML engine can analyze the image data to detect the usage of a supply over time and to determine when more of that supply should be ordered. In some cases, the sensor data may be non-image data or non-computer vision data, such as gauge data or any other type of data. In some cases, the sensor data can be used by the service to determine how much inventory currently is available or is likely needed in the future.

As one example, consider a scenario where a lightbulb is broken. A sensor can detect this broken lightbulb. Additionally, or alternatively, a work order may reflect that the lightbulb has been replaced by a technician. The disclosed service is able to analyze the work order and detect that a new bulb from inventory was used to replace the broken bulb. The service may then reflect the change in its inventory database. Thus, in some scenarios, data obtained from non-sensor data may be used, one example of which is data obtained from a document or form, such as a work order. In some scenarios, technician input or feedback can also be used to trigger updates to inventory or parts.

Figure 10:
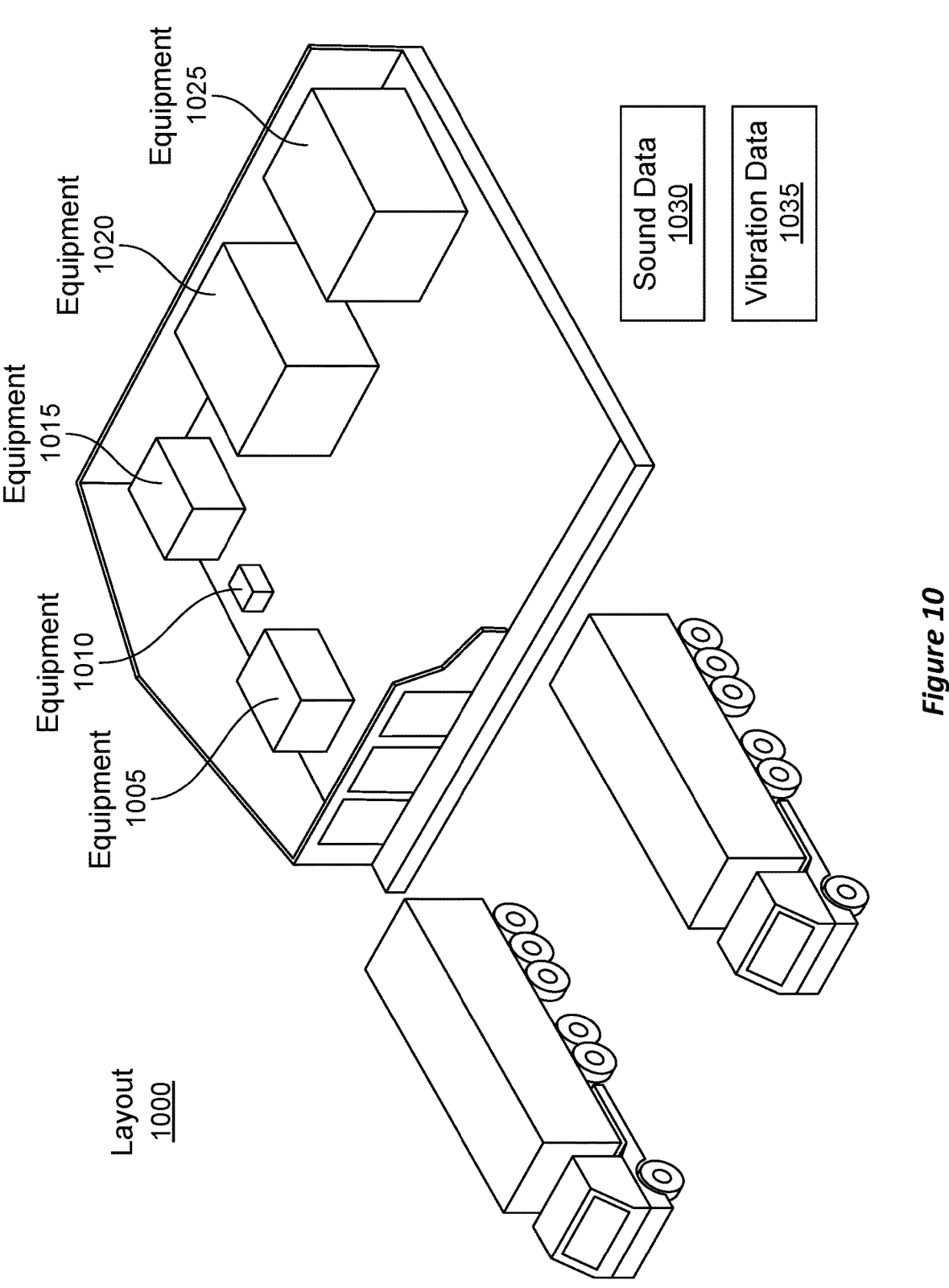
FIG. 10 illustrates an example in which the layout of an asset is being analyzed.

FIG. 10 shows an example layout 1000 of a warehouse that includes multiple units of equipment, such as equipment 1005, 1010, 1015, 1020, and 1025. Information describing the layout of these various units (e.g., perhaps image data, model data, or layout data) can be provided to the service 205, and the service 205 can perform an analysis to determine whether that layout 1000 is optimal for those specific units of equipment. In some cases, additional data can be acquired, such as sound data 1030 and/or vibration data 1035.

Figure 11:
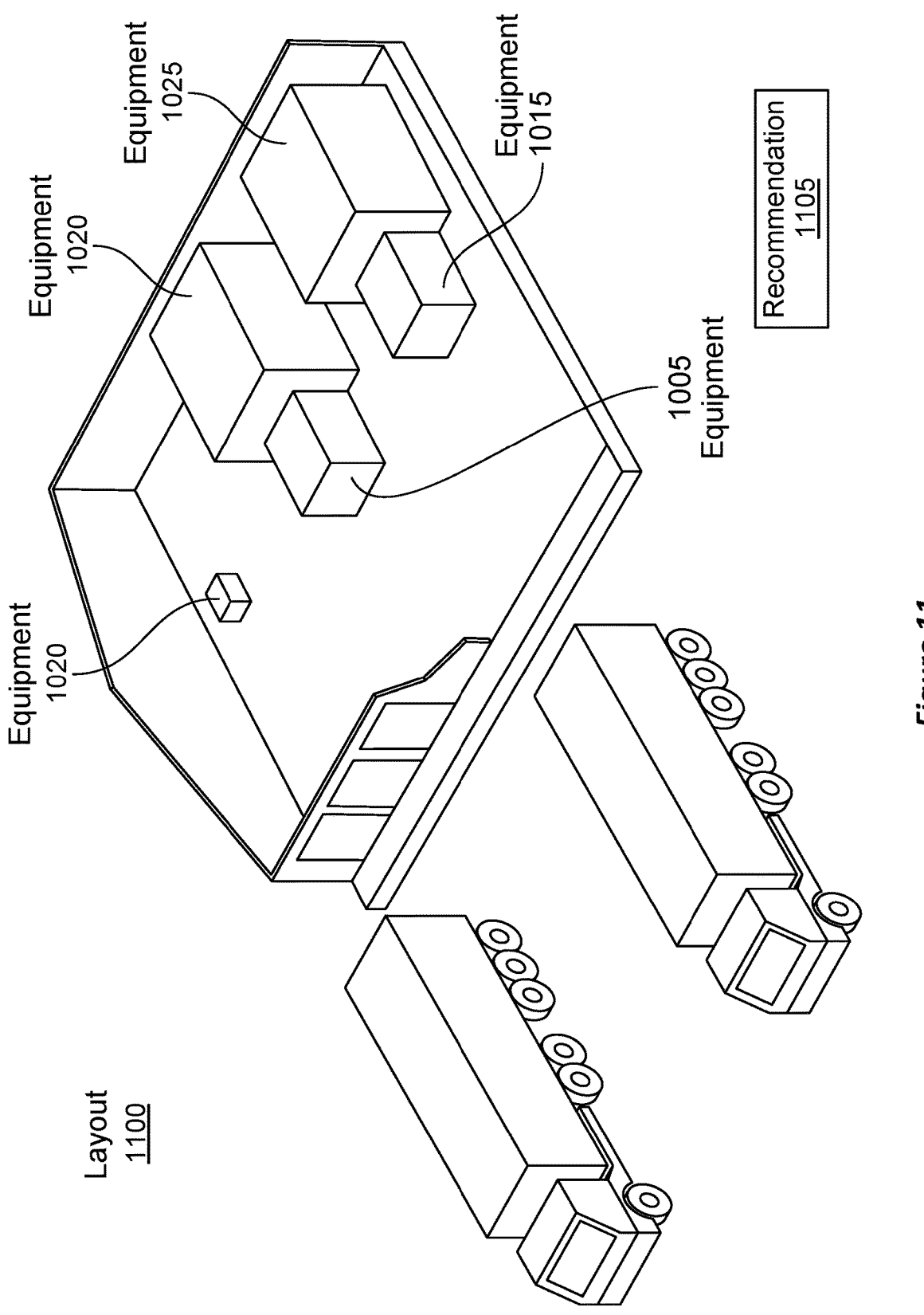
FIG. 11 illustrates an example in which a recommendation for a new layout is provided.

It may be the case that one unit of equipment is particularly sensitive to vibrations. If that unit was located proximately to another unit that vibrated, then that placement or layout may not be ideal. The disclosed service is able to analyze the placement or layout of the various units of equipment in a facility, and the service (e.g., particularly the ML engine) may submit a recommendation as to a more optimal layout for the equipment. In another scenario, other recommendations or other types of recommendations can be generated. As some examples, the service can generate a recommendation that is related to a schedule for a service or a recommendation relating to content of a service procedure. Recommendations related to parts, inventory, or any type of scheduling can be generated. FIG. 11 is illustrative of the initial layout example.

Having analyzed the previous layout, service 205 submitted a new recommendation 1105 for a new layout 1100, which is now implemented in FIG. 11. Layout 1100 shows the new placement of the equipment 1005, 1010, 1015, 1020, and 1025. This new layout 1100 may take into account vibration sensitivities, noise sensitivities, climate conditions, sunlight conditions, or any other parameter. Accordingly, the disclosed service is not only able to propagate updates to manuals and other information for an asset, but it also includes intelligence for improving how assets are physically disposed relative to other assets and other positional constraints.

Figure 12:
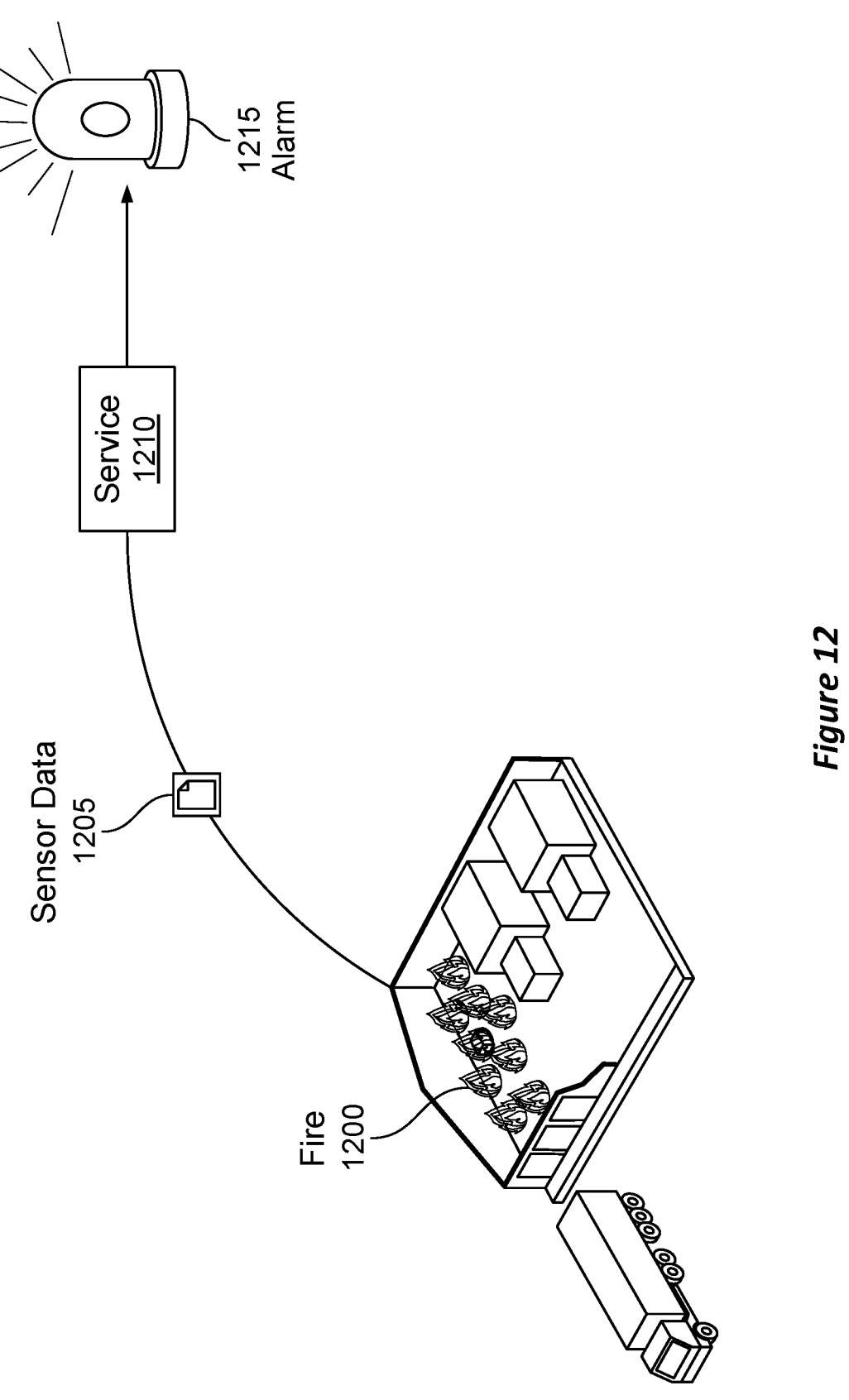
FIG. 12 illustrates an example where sensor data is being used to generate an alarm or alert.

FIG. 12 shows another example scenario in which sensor data is acquired and analyzed. In FIG. 12, a fire 1200 is currently happening in the warehouse. Sensors in the warehouse are able to detect the change in temperature conditions, oxygen conditions, lighting conditions, or any other environmental conditions. These sensors produced sensor data 1205, which is transmitted to the service 1210, which is representative of service 205 from FIG. 2. Service 1210 is able to analyze the sensor data 1205 and determine that a fire (or any other occurrence) is happening. In response, service 1210 is able to raise an alarm 1215 or alert to notify a responsible party. The above example may be considered as a type of potentially catastrophic example. A person skilled in the art will appreciate how less severe example scenarios are also covered by these principles. For instance, a particular asset may shut down due to certain conditions, such as perhaps overheating or exhaustion of a particular supply. The embodiments are able to determine when such events happen and trigger alerts based on those events. In some cases, alerts can be triggered when a technician reports a finding. Accordingly, different levels of severity can be detected and acted upon or in response to their detection.

Figure 13:
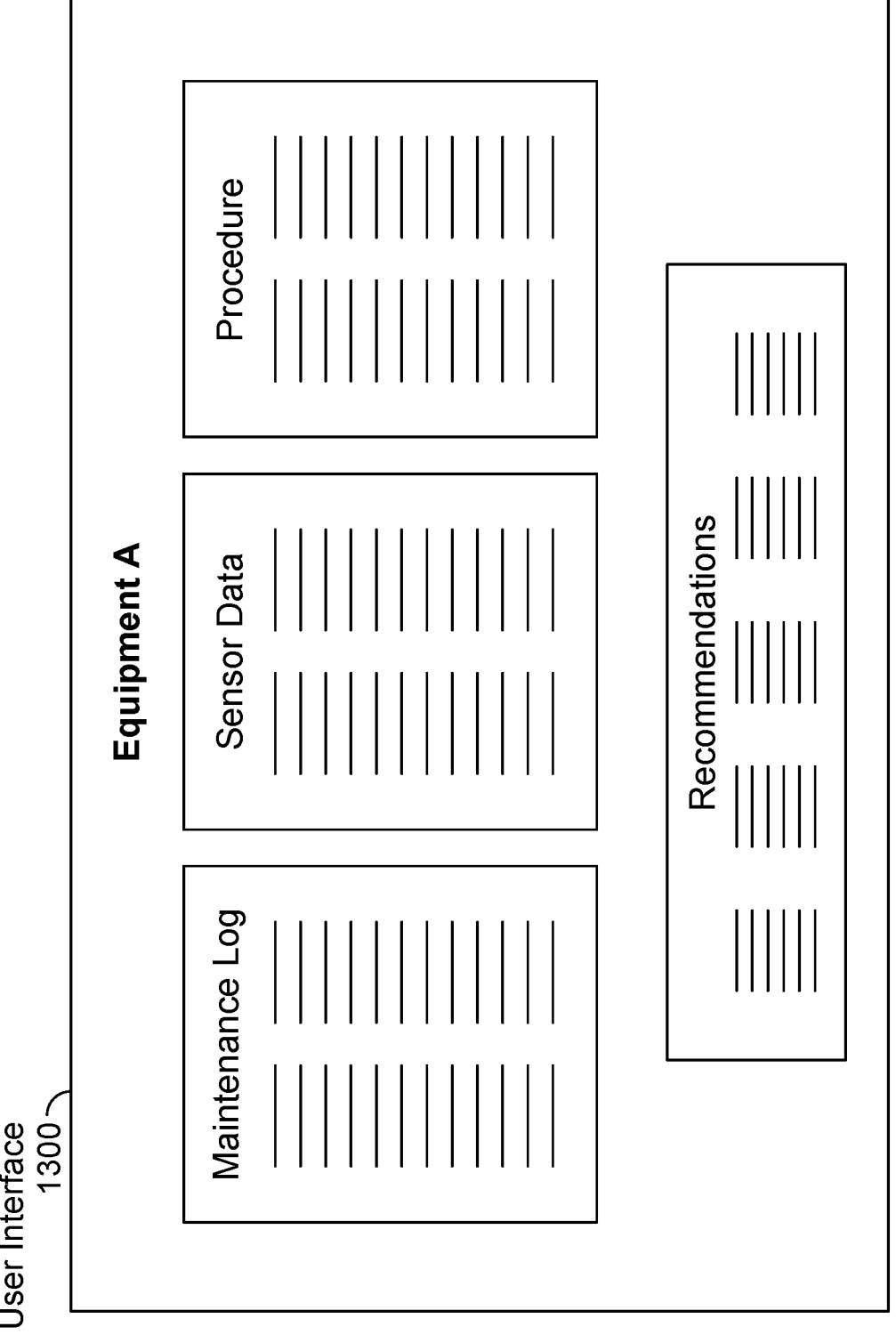
FIG. 13 illustrates an example user interface.
Figure 14:
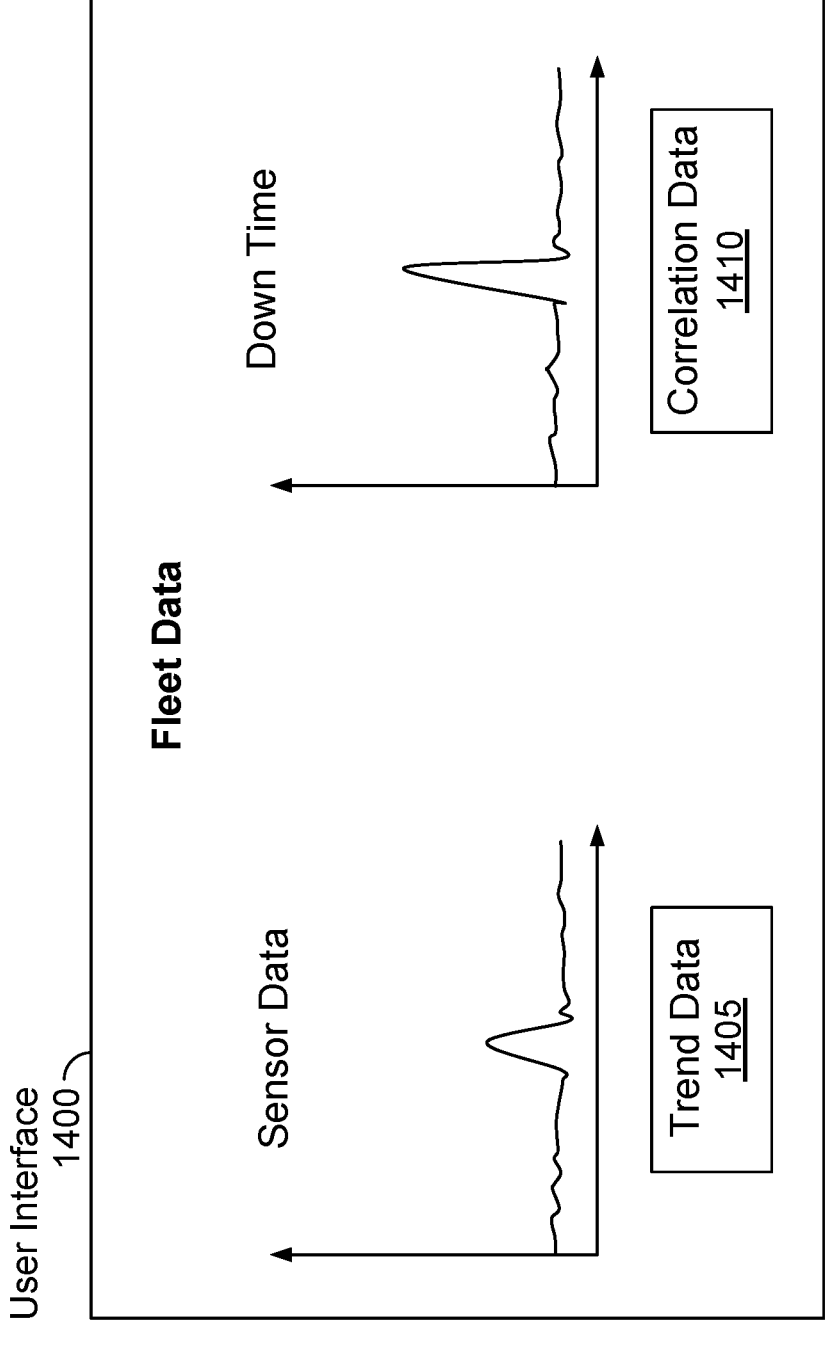
FIG. 14 illustrates another example user interface.

Attention will now be directed to FIGS. 13 and 14, which illustrate various examples of some user interfaces that may be displayed or surfaced. FIG. 13 shows a user interface 1300 that may be presented to a consumer using the asset management platform 210 of FIG. 2. User interface 1300 is shown as including various different pieces of information. Examples of such information include, but are not limited to, details regarding when an asset was maintained (e.g., recorded in the maintenance log), details regarding data obtained from sensors (e.g., recorded in the sensor data), details regarding procedures for an asset (e.g., recorded in the procedure), and details regarding various recommendations that may be generated (e.g., recorded in the recommendations).

FIG. 14 shows an example user interface 1400 that may be shown to a user of the package authoring platform 245 of FIG. 2. User interface 1400 can be used to author various packages. User interface 1400 can also display information about various assets. Such information includes, but is not limited to, sensor data, trend data 1405, down time, and correlation data 1410. For instance, FIG. 14 shows a plot of sensor data. Notice, there is a peak in the sensor data near the middle of the graph. Similarly, there is a peak in the chart of the down time. A review of the sensor data and the down time may unveil a correlation between the peak in the sensor data and the peak in the down time. For instance, the sensor data shows an anomaly occurring in the central area of the graph. It is likely that the anomaly caused the down time for the asset. The embodiments are able to analyze the sensor data and generate correlations and predictions based on that data.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 15A:
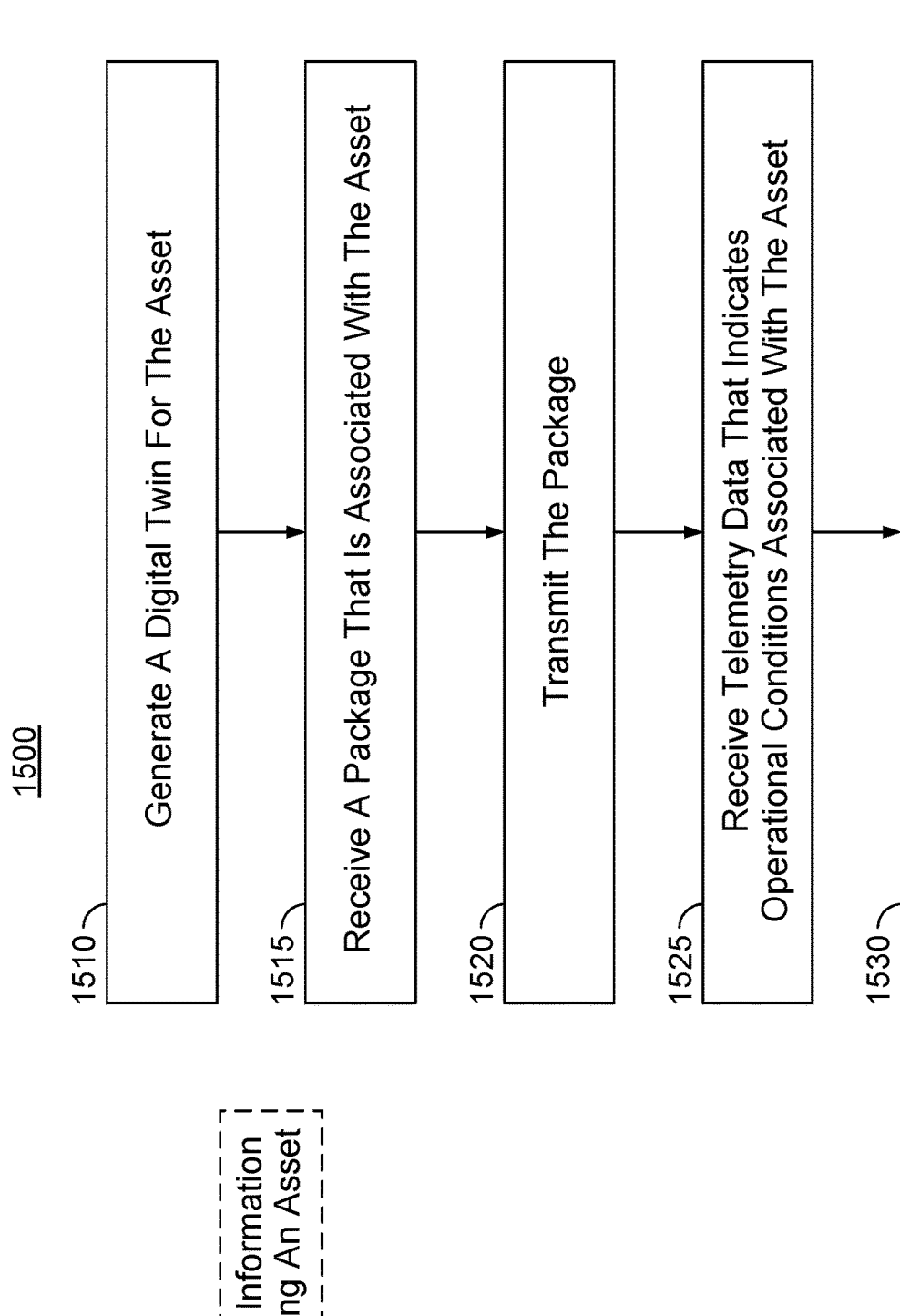
FIGS. 15A and 15B illustrate flowcharts of an example method for propagating an authored package.
Figure 15B:
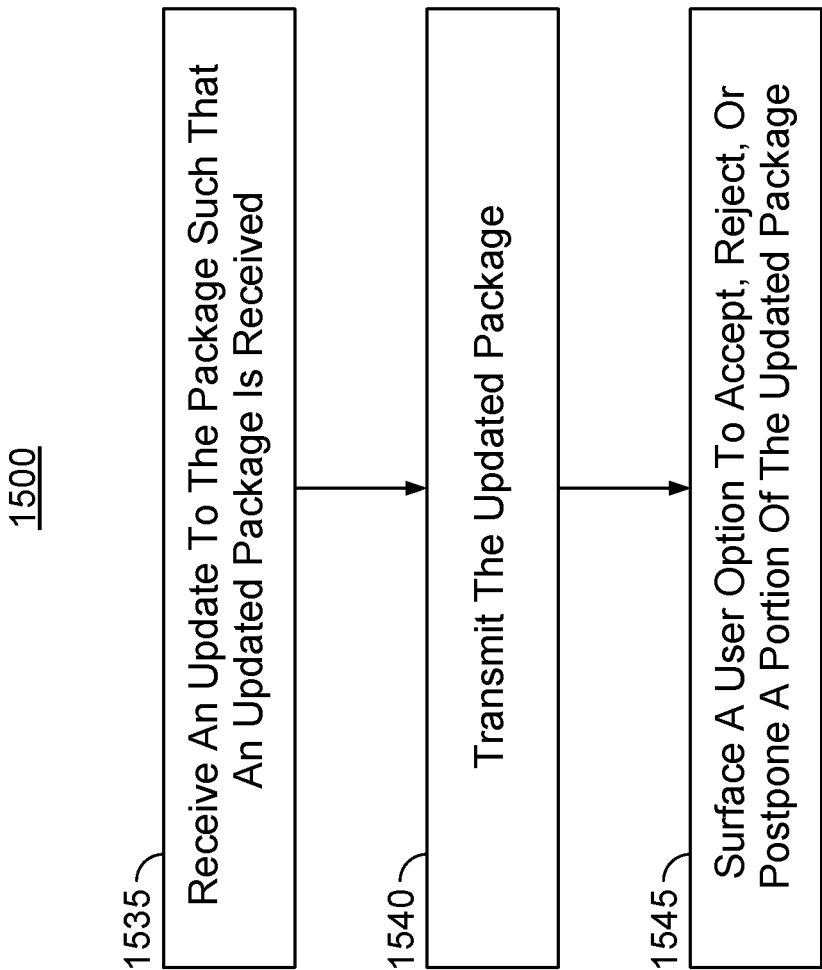

Attention will now be directed to FIGS. 15A and 15B, which illustrate flowcharts of an example method 1500 for propagating a package from a package authoring platform (e.g., package authoring platform 245 of FIG. 2) to an asset management platform (e.g., asset management platform 210 of FIG. 2). Method 1500 may be implemented by service 205 of FIG. 2. Service 205 may implement or be the disclosed LLM agent.

Method 1500 includes an act (act 1505) of acquiring, from the asset management platform, information describing an asset (e.g., asset 220 of FIG. 2). That information may include any of the data 300 from FIG. 3. In some instances, the information describing the asset may include one or more of: a make of the asset, a model of the asset, a position of the asset, or a proximity of the asset to another asset. Act 1505 is shown as being a separate box that is located outside of the remaining sections of the flow chart. Act 1505 is also shown as being in a dashed line box. The dashes demonstrate how act 1505 is an optional act that is not necessarily required. Furthermore, act 1505 is shown outside of the flow chart to illustrate how this operation, which is optional, can be performed asynchronously with respect to the other acts.

By way of further clarification, consider how traditional software packages are updated. The developer asynchronously and independently creates an update to a package or perhaps creates a whole new package for an asset. That update is not dependent on what applications customers may have; rather, the update is generated for a particular application. After the update is authored, it is then rolled out or transmitted to whichever customers have that particular application. Thus, the initial creation of the update is not dependent on client information. Determining to whom the update will be transmitted may be dependent on client information, but the actual authoring of the update is not dependent on client information.

In some scenarios, the service includes a machine learning (ML) engine. The ML engine can use data (e.g., perhaps telemetry data) to submit a recommendation to the asset management platform. Optionally, the recommendation may include one or more of: a recommendation as to a new position for the asset, a recommendation as to when the asset is to be serviced, or a recommendation as to when a supply for the asset is to be replenished. As another option, the data (e.g., perhaps telemetry data) may include one or more of: image data, environmental conditions data, or instrumentation data. A recommendation may be generated based on the telemetry data.

Act 1510 includes generating a digital twin (e.g., digital twin 240 of FIG. 2) for the asset. Notably, the digital twin is a digital representation of the asset.

Act 1515 includes receiving, from the package authoring platform, a package (e.g., package 250). This package is associated with an asset. The package also outlines a set of governing criteria (e.g., governing criteria 250A) for the asset. Optionally, the package may include one or more of: parts data for the asset, procedure data for the asset, a work order template for the asset, vendor data for the asset, or instrumentation data for the asset. In some instances, the governing criteria for the asset includes one or more of compliance data with respect to a regulation associated with the asset or performance information associated with the asset. In some instances, the package is a nested or embedded package in which one or more additional packages are nested or embedded therein.

Although not included in FIG. 15, method 1500 may include an act of determining which customers or clients have the asset for which the package has been authored or updated. Thus, the embodiments may determine that the asset management platform is tracking the asset and is thus an entity to which the authored package (or an update) should be delivered. In some cases, this determination is based on the information that was obtained as a part of act 1505. Thus, the package is independently authored and/or updated with respect to information that may be obtained relating to which clients have the actual asset. Stated differently, an asset's package is authored and/or updated on the OEM side even if no information is currently available as to which clients have the asset. Later, the service may attempt to determine which clients actually have the asset so that the package or update can be properly delivered to those clients.

Act 1520 includes transmitting the package to the asset management platform. For instance, the package authoring platform transmits the package to the service 205. Service 205 is then able to transmit the package to the asset management platform 210. In some cases, transmitting the package is performed in response to a download request received from the asset management platform.

For example, in some cases, the process of transmitting the package to the asset management platform includes providing a scannable code or other information to the client so the client can access or download the package, such as from the service. For instance, the scannable code may be a QR code or perhaps a URL link. Any type of scannable or clickable code or link may be used.

Act 1525 includes receiving, from the asset management platform, telemetry data (e.g., telemetry data 305 from FIG. 3). This telemetry data indicates operational conditions associated with the asset. In some implementations, the telemetry data includes one or more of: sensor data from a sensor external relative to the asset (e.g., perhaps a camera aimed at the asset) or sensor data from a sensor associated with the asset (e.g., perhaps a sensor included as a part of the asset, such as a pressure gauge). Thus, the embodiments facilitate a two-way update process. For instance, one update involves a package being authored or updated and being transmitted to the client, thereby updating the client. Another update involves the client providing telemetry data to the OEM, thereby updating the OEM. Thus, there is a two way update process, which is facilitated by the service, between the OEM and the client/customer.

Act 1530 then involves using the telemetry data to determine compliance with the governing criteria of the package. For instance, the telemetry data may include sensor data, maintenance data, preventative care data, and so on. That data can be used to determine whether the governing criteria included in the package is being satisfied.

In one example scenario, the ML engine 205A (including the disclosed LLM agent) may initially be trained using a set of training data. This training can enable the ML engine 205A to initially determine whether compliance with a given governing criteria is satisfied. In some instances, after specific types of telemetry data is obtained, such as is mentioned above in act 1530, the ML engine 205A can be further tuned or further trained to operate using that specific type of telemetry data. For instance, the ML engine 205A can be tuned to operate using specific types of telemetry data obtained from a particular source, client, or vendor. Thus, ML engine 205A may be subjected to a multi-stage or multi-phase training approach.

In accordance with the disclosed principles, the embodiments are able to use a combination of multiple different types of telemetry data to more robustly determine whether a set of governing criteria are satisfied. The ML engine 205A can be progressively tuned and trained over time in an effort to reduce false positives. This reduction in false positives can be achieved by utilizing an iterative training algorithm in which the ML engine 205A is retrained with an updated training set containing false positives produced after analyzing telemetry data in view of the governing criteria. This combination of features provides a robust compliance model that can determine compliance with governing criteria using telemetry data while limiting the number of false positives.

Method 1500 continues in FIG. 15B. For example, act 1535 includes receiving, from the package authoring platform, an update to the package. The service may receive this update. Consequently, an updated package is received at the asset management platform.

Act 1540 includes transmitting the updated package to the asset management platform. For instance, the service may transmit the updated package to the asset management platform.

Act 1545 includes surfacing a user option to accept, reject, or postpone a portion of the updated package. For instance, a user interface showing the information presented in FIG. 6 can be provided to a user, and the user can elect to accept, reject, or postpone portions of the updated package.

In some embodiments, method 1500 further includes an act of receiving feedback data from the asset management platform. Another act involves modifying, based on the feedback data, the package. Yet another act involves propagating the package to a different platform that is identified as having a similar asset as the current asset.

Another act may include acquiring data from one or more other platforms having other assets that are identified as being similar to the current asset. The embodiments may then compile fleet data that corresponds to the current asset and those other assets.

Optionally, a user interface may be provided to a user. The user interface may include a feature for displaying deltas that exist between the package and the updated package. In some scenarios, the user interface further includes a feature for receiving user input from the user. The user input may include one of an acceptance, a rejection, or a postponement for at least one delta included in those deltas. Thus, in some embodiments, the package is periodically updated by the package authoring platform, and those updates can be acted on by a user of the asset management platform.

In some cases, method 1500 may further include providing a prediction to the asset management platform. The prediction can optionally relate to a supply chain for the asset.

When installing a package, the disclosed solutions allow a consumer to select which components are to be installed. Components that are considered to be "core" components may require installation. For instance, a step included in a standard operating procedure focused on health and safety provided by OSHA may be considered a core component and may require installation. However, it is possible that a consumer can select between variants of the same procedure or group of procedures based on different factors, such as regulations, team composition, and environment.

For example, a specific piece of equipment might have a different set of maintenance procedures depending on whether the equipment is installed indoors or outdoors. In some scenarios, most of those procedures will be pre-configured by the equipment manufacturer for each respective customer, or at least each respective class of customer, so the solution is as turn-key as possible. That being said, these components and procedures can be modified locally by the customer through symbol properties without detaching the symbol from its main author. FIG. 6 described a scenario in which certain components or procedures can be modified locally. In some instances, when a component is locally modified, a notification is transmitted to the service 205 and/or the package authoring platform 245 so a record of such a change can be maintained.

During installation of an asset, it is possible to associate symbols from the package to existing entities. For example, a package may attempt to install a component for spare parts. If, however, the consumer already has some compatible parts on-hand, the embodiments can map the component for that part to the one the consumer already has in order to fulfill that functionality. That component would thus preserve its functional link with other components of the package. Therefore, if the package also installed a maintenance procedure involving the replacement of the part, the ones the consumer designated will be used when subtracting inventory or when ordering new replacements.

As mentioned earlier, the embodiments are flexible enough to allow embedding of component symbols inside each other as building blocks in an ecosystem and to allow data flows in any direction. To illustrate this, consider an example where the CDC (Center for Disease Control and Prevention) publishes a standard operating procedure documenting the steps and instructions that need to be followed to deal with a specific virus or health risk from their perspective and mission of equitably protecting health, safety, and security.

A regulating body (such as OSHA) would install that symbol as part of their own standard operating procedure, and they surround it with extra steps and instructions that are in line with their own mission of ensuring safe and healthful working conditions for workers.

Following that, a manufacturing company can put together a certain procedure documenting how to maintain a piece of equipment they are manufacturing, where that equipment has to be compliant with certain OSHA regulations. At that point, the manufacturer would install the official symbol that OSHA published to cover those regulations and would make it a part of their own package, again prepending and/or appending additional steps and instructions that would be specific either to their business, industry, or even to that specific piece of equipment.

Finally, that manufacturer's customers, upon receipt of the equipment, would install the software package that is bundled with it. The customer/consumer would conduct maintenance and repairs using instructions that have seamlessly been assembled from a chain of sources, both governmental and corporate in this case.

Updates can also trickle down the symbol chain that was just presented. To continue with the above example, consider a scenario where the CDC might have learned more information about a specific virus out of scientific research. The CDC may desire to update the procedure it had previously built to account for this new knowledge. After doing the required edits, the CDC may publish a new version of its standard operating procedure. Then, OSHA, being the next entity down the chain, would be notified that a new version is available for one of the packages they depend on in their own packages. OSHA would be presented with a view showcasing the differences between their current version of the CDC package and the one they are trying to update to. OSHA would be able to apply the update and publish a new version of their own package.

This would lead to a similar update flow for the manufacturer and eventually for their customers. It might be the case that these customers have multiple packages installed for multiple pieces of equipment, potentially coming from different manufacturers. The more composition there is, the more scrutiny and selectivity there needs to be on how and when updates are applied. That is why it is possible to locally select which packages and components are to be updated when examining the differential comparison mentioned above. Reasons for postponing or skipping a component update can be varied, but incompatibility with another package or a known issue with a specific version may be cited as examples.

The above discussion focused on scenarios describing how data flows "down" the symbol chain. Data can also flow "up" the chain, however.

For instance, consider a scenario where a piece of hardware is deployed to a customer of a manufacturer. This hardware can be analogized to a data container that stays connected to the backend. Often, there is a constant stream of data that flows back up the package chain, with the goal of providing proper logging and monitoring to the owner and publisher of each package.

The manufacturer might be interested to know about the usage of parts, especially around how and where they were used to execute maintenance and servicing work, as opposed to how many were in the customer's inventory and when they were used. This could help understand what subsystems of a piece of hardware are more prone to failure and may subsequently drive the decision to harden those in future iterations. Knowing about the usage of parts could also play a role in the manufacturer helping its customers replenish their inventories, either directly or through partnerships, to ensure they at least have the critical amount on hand, especially when the lead times are longer.

Other examples of data flowing back to the manufacturer include the historical uptime and downtime trail of assets, current and historical readings from IoT (Internet of Things) sensors (or even from manual entry), and PLC (Programmable Logic Controller) of the equipment. The embodiments are able to acquire a 360 degree view for each piece of horizontally deployed hardware. The embodiments are further able to identify patterns, trends, and anomalies that might help inform either immediate servicing recommendations and/or future updates/iterations on the hardware itself, as well as on its published package(s).

Another piece of relevant information flowing back up may include the information filled while following procedures and the pace of completion of workflows. This kind of information will allow manufacturers to take a horizontal look at their distributed fleet for a specific piece of hardware and to identify potential process improvements. In this sense, the embodiments can utilize a type of rule engine that manages, routes, or approves workflows. This rule and workflow engine can connect events and triggers in an industrial environment with approval conditions or gates. As an example, consider a scenario involving a multi-step approval for purchase orders that go from a plant manager to a procurement team and then to the finance team. The rules and workflow engine can monitor the progress of these authorizations and can help facilitate the overall process.

In some example scenarios, the LLM agent can generate a workflow and facilitate the performance of that workflow in an autonomous manner. For instance, using the multi-step approval example above, the LLM agent can generate each step that may be required and the operate to perform each of those steps.

As another example, if the manufacturer notices that a specific procedure is regularly getting completed 10 minutes faster across the same 25% of the fleet, the manufacturer may desire to investigate why that is. Using the acquired data, the manufacturer may be able to draw conclusions and potentially even submit recommendations to other consumers. Notably, manufacturers may first want to make sure that there is no negligence happening that could put the health and safety of workers at risk, in which case any presumed "improvement" or "speed-up" in a procedure will be dismissed and the troublesome behavior will be reported.

However, once all potential process faults are cleared, the manufacturer will be able to study this significant performance gain from all possible angles, which include: data, customer interviews, and so on. The manufacturer might find out that a subset of wise workers has identified that if a swap in some of the steps in the procedure was made, the work actually becomes easier to perform. If there is no delta on the riskiness of a potential maneuver change, then that change may be highly beneficial to incorporate into future iterations of a procedure. Thus, this change can be propagated down the chain to ultimately benefit the end customers.

With respect to the previous OSHA example, regulatory bodies will also benefit from procedure answers and completion performance flowing back upstream. For example, it is possible to detect if there is risky behavior happening (and even to quantify how risky it is) based on answers (or lack thereof) of a standard operating procedure around health and safety that would have been distributed through an official OSHA package. In the most critical of cases, that information could even be used to intervene and prevent an imminent work accident. In a more general capacity, it could help grade organizations on their observation and compliance of OSHA standards, help conduct regular and even automated audits, and so on.

The disclosed embodiments beneficially empower and enable users and maintainers to contribute back and share improvements and fixes to their hardware packages. A package user can decide to detach some components from their origin symbol so they can either adapt them to their needs that are too specific or so they can improve them and contribute those improvements back upstream.

Accordingly, the disclosed embodiments fill numerous gaps in operations involving hardware assets. Now, hardware manufacturers and regulators will be empowered to deploy, update, and monitor their equipment or regulations in a horizontal fashion to all their customers. Advantageously, the disclosed solutions help to bring in better visibility on day-to-day operations and usage of hardware, with better guarantees around reliability, performance, health and safety, and machine learning insights into performance, efficiency, and possible future improvements.

The embodiments are also able to dynamically obtain contextual information for assets. This contextual information can include a broad plethora of information. For instance, the contextual information may include a standard operating procedure for an asset. The contextual information may also include scanning data of the asset, such as perhaps a surface reconstruction mesh of the asset or a light detection and ranging (LIDAR) scan of the asset or any type of computer vision. Different inputs can be used to recognize an asset.

Information can also be overlaid on a screen or using an extended reality system to describe the asset. For instance, suppose a technician is wearing a head mounted device (HMD) comprising an extended reality system. While the technician is working with the asset, the HMD can display different holograms and visual information to assist the technician in performing his/her tasks. This displayed information can include procedure steps, warnings, standard operating procedures, sensor data, or any other type of telemetry data. The HMD can be used to recognize an asset simply by scanning the asset. The HMD can then consult the asset's digital twin to obtain information about the asset.

In some cases, specific assets can be associated with a corresponding symbol, such as perhaps a QR code, bar code, or some other unique code. The HMD (or any other device) can scan the code to determine what type an asset is and to obtain information about that asset. Additionally, or alternatively, the HMD can scan the asset itself and, based on the determined shape of the asset, determine the asset's type and then obtain information about the asset.

As mentioned previously, the ML engine 205A can also be used to help identify assets. For instance, the ML engine 205A may initially be trained using image data to recognize different assets. Later, the ML engine 205A may be further tuned or trained based on different types of input data, such as perhaps scanning data, computer vision data, or LIDAR data. This scanning data can be used to further train the ML engine 205A in an effort to better recognize assets.

Different levels of compliance granularity can also be evaluated. For instance, different levels of governing criteria (or a hierarchy) may be established. As one example, a warehouse may have very detailed requirements and guidelines to determine compliance. A regional management entity may have a higher level or more abstract set of governing criteria. Regardless of the number of different levels or hierarchical steps of governing criteria, the embodiments are able to determine whether specific scenarios are in compliance with those various different governing criteria.

Different sources of governing criteria (e.g., OSHA, a management entity, internal enterprise, external enterprise, etc.) can provide governing criteria or regulations, and the embodiments are able to determine whether compliance is given to each of those different sources. The embodiments are also able to determine compliance by performing forward and backward propagation with respect to generating governing criteria and determining whether compliance is being given for that criteria.

The disclosed embodiments are also able to perform or implement bitemporal modeling. Generally, bitemporal modeling refers to a particular type of temporal database modeling technique. This technique involves the handling of historical database data using two different timelines, such as an actual state of data versus a recorded state of that data.

The disclosed embodiments can optionally use bitemporal modeling to track the uptime/downtime status of a customers' assets in the disclosed system. The status information that is tracked may include status history, which can be replayed even from the perspective of a previous point in time. This feature is particularly beneficial for audit purposes.

As an example, consider a scenario where an asset has been down at time "A." It may be the case that a worker later inserts an uptime sequence that covers time "A." While from today's perspective that asset was up at time "A," if one were to look at the asset's uptime from the perspective of time "A," it would actually show the asset as being down. Thus, bitemporal modeling is particularly beneficial in scenarios involving auditing and asset tracking and is helpful to prevent scenarios where a potentially malicious user is attempting to hide or conceal information. Thus, use of the bitemporal modeling provides a verifiable record to track when assets are up or down. This information can also be used to make predictions as to future operational behavior of an asset. For instance, the up and down time of an asset, as tracked using bitemporal modeling, can be used to predict the future up or down time of the asset.

In some scenarios, the prediction data can be stored and then later compared to actual data. For instance, using a plot as an example, the prediction data can be plotted and overlaid on actual data that was produced. The overlay can compare the closeness between the two plots. It might be the case that the prediction was highly accurate and thus closely reflected the actual data or actual outcome. On the other hand, it might be the case that the prediction was not accurate and thus deviated significantly from the actual data. The ML engine 205A can be further trained and tuned based on this subsequent overlay comparison. The ML engine 205A can be trained so as to improve its predictive abilities based on actual data that was produced, where this improvement comes from a multi-stage training approach.

The embodiments are further able to use generative artificial intelligence (AI), large language models (LLMs), and/or optical character recognition (OCR). As one example, the embodiments are able to consume large PDFs (e.g., over 500 pages with figures, tables, etc.) of asset manuals to help customers build their standard operating procedures using information from these manuals. The ML engine 205A may include generative AI features, LLM features, and OCR features. In this regard, the disclosed ML engine 205A can actually build a standard operating procedure for a customer by aggregating and analyzing data from multiple different sources.

The above processes allow the embodiments to form relationships between disparate data sets, including text data, image data, audio data, and potentially video data. Links or relationships can be created from these different data sets.

For instance, consider the following example scenario. The embodiments can perform OCR on a pdf and map out the various keywords that are embedded in the pdf. The embodiments can also analyze received telemetry data, which might include data points, image data, computer vision data, graphs, charts, and so on. The embodiments are able to form relationships between the parsed text and the telemetry data, such as to create the standard operating procedure.

The embodiments can also intelligently create various holograms or virtual data that can be displayed to assist a user in performing specific tasks. Thus, the embodiments are able to improve upon traditional OCR processes by not only performing OCR but also by creating relationships from disparate data sets so as to form intelligent linkages between those data sets and to potentially build a procedure for an asset or to generate helpful holograms. Intelligent actions and inferences can then be performed to determine how to improve interactions with the data and with an asset.

The embodiments can also detect anomalies in industrial settings. Generally, anomaly detection refers to the process of detecting data points, events, or perhaps even entities that fall outside of a given normal range of data. In other words, an anomaly is a data point that deviates from a standard.

The disclosed embodiments are able to perform anomaly detection in an industrial setting where technicians in the field can fill out fields in standard operating procedures and can be alerted if the inputted value deviates too much from what is expected, based on a confidence threshold. Oftentimes, this will have been a manual input error (such as an extra digit typed by mistake) and can be fixed on the fly.

The embodiments can account for seasonality, holidays, environmental conditions, or other factors that may influence a given metric. Regardless of the scenario in which anomaly detection is used, the embodiments are able to raise flags on anomalies in an effort to ensure assets and working conditions are within standard ranges. If they are not, alerts and warnings can be triggered so the corrective actions can occur.

As another example of anomaly detection, consider a scenario involving a part replacement. It might be the case that under normal circumstances a given part will last between 3-5 years. In this example, however, the part is having to be replaced every 6 months. This frequency represents an anomaly. The embodiments can report this anomaly and an investigation can be performed to determine why this part is failing so often. It might be the case that this investigation reveals a larger problem that needs to be solved. The LLM agent can attend to performing the investigation on its own by acquiring sensor data, such as perhaps image data. For instance, the LLM agent can obtain an image of the part, perhaps from different cameras positioned at different perspectives relative to the part. The LLM agent can perform image analysis of the various images from the various different perspectives. This analysis may reveal the reason as to why the part is failing. The LLM agent can then trigger the replacement of the part based on the determination that it is failing. Additionally, the LLM agent can attempt to modify the operation of the asset or the procedure of use for the asset to try to ensure that the failure does not occur again. For example, it might be the case that the failure occurred because the asset was operating above a given threshold, resulting in perhaps vibrations or strain. The LLM agent can attend to the modification of the use of the asset by instructing or controlling the asset in a manner so that the asset does not operate above the given threshold.

Thus, the embodiments are able to obtain information from multiple different sources, including work orders, procedures, standard operating procedures, and so on. The embodiments are then able to build a model using that information. This model can monitor historical and current information to determine whether current trends deviate from established patterns. In this manner, the model considers multiple different types of data, and the embodiments are able to form relationships from these different types of data to determine established patterns.

Optionally, the disclosed embodiments can dynamically create new standard operating ranges or procedures for assets based on monitored data. As one example, it is often the case that a formal standard operating procedure lists very conservative ranges that perhaps are overly limiting. It might be the case, however, that because of certain environmental conditions or other operating conditions for an asset, this conservative approach is too restrictive, and the ranges can be extended. The embodiments can track when an asset repeatedly operates outside of an established range and can dynamically create an updated range that is still safe. This updated range may then operate as the "normal" range for the asset. Accordingly, a root down time analysis can be performed, updated and ranges can be determined, and new procedures can be created.

As another example, consider a scenario where a technician snaps a picture of a gauge on an asset. The embodiments can use their image analysis tools to discern the conditions represented by the gauge. Then, the embodiments can use their anomaly detection tools to determine whether those conditions are normal or are out of range. Thus, any number of different tools can operate together to provide a synergistic effect.

The disclosed embodiments can also incorporate various different reporting engines (including asset health) and procedure engines. For instance, the embodiments may include an advanced and composable engine that programmatically "slices" information describing an industrial environment, such as tasks, users, parts, assets, locations, vendors, etc.

The embodiments thus have the ability to create multiple custom views with these reports via the slicing action. By way of further clarification, consider a body of data that is perhaps plotted on a 3D plot. The embodiments include a user interface that allows a user to slice the plot along various different vertices to view the data from different perspectives, angles, and configurations. This slicing action may allow the user to discern anomalies or other points of concern. Different groups of data can be made, and the embodiments can analyze that grouping of data. Optionally, slices can be made, and results can be displayed on various dashboards.

The embodiments also include tools to build, update, propagate, and use or fill advanced standard operating procedures. These procedures may include nesting procedure templates that are nestable within each other. These procedures can also capture different types of information, can show fields based on different conditions, and can score fields using weights. Procedures can be dynamically updated over time and new information is made available.

Some embodiments utilize a permission system. This system can optionally provide a granular cascading permission system that takes into account a user's role, including that user's role within a team. The permission system can control what data the user and/or the team is able to view and/or edit. The ML engine 205A can also be involved in this permission system. For instance, the ML engine 205A can maintain historical data of access rights for a given user or group of users. It might be the case that a user suddenly is provided new access. The ML engine 205A can analyze this new access to determine whether it is an anomaly and potential security breach.

The embodiments also enable integrations with various third-party software. These integrations allow the disclosed systems to synchronize operational and financial information between systems in an industrial environment. These integrations can be implemented as plug-ins, add-ins, or can be implemented using application programming interfaces (APIs).

Some embodiments include functionality for predictive AI, such as to forecast when certain parts will be needed, when maintenance should be performed, or when assets are to be rotated. The embodiments include the ability to leverage historical data around spare parts usage to forecast the timing of future spare part needs and inventory management. The embodiments can also model an asset's health. For instance, the embodiments include the ability to leverage historical data around equipment downtime to help prevent downtime and optionally to predict downtime.

In addition to predictions, the embodiments can provide recommendations to users. These recommendations may be of any type and any breadth. For instance, the recommendations may include a recommendation to service a particular asset in a particular way at a specific point in time in an effort to prevent a predicted scenario. The recommendations may include moving certain assets based on detected environmental conditions.

The embodiments can also receive feedback and incorporate that feedback into their routines. This feedback can be used to update the machine learning models so as to improve the predictive abilities. The embodiments can provide predictions at a higher level, such as at an enterprise level, a community level, or even a higher level (e.g., perhaps a geographic region, such as a state). These predictions can be relayed to entities in an effort to improve their functionality. Crowd sourced information can be used to further guide behavior, to determine what constitutes an anomaly, and to make predictions.

Accordingly, service 205 of FIG. 2 may be further configured to use a machine learning (ML) model to predict a state of an asset. For instance, service 205 can use bitemporal modeling to track status information of an asset. The status information may include at least one of an uptime or a downtime of the asset. The bitemporal modeling provides records detailing a current state of the asset's status information and records that are navigable to detail previous states of the asset's status information at a selected point in time.

In some cases, the bitemporal modeling provides an auditable log for the asset. Also, the status information may be obtained from a plurality of different sources. These sources may include, but are not limited to, at least one text source (e.g., perhaps a procedure) and at least one image source (e.g., perhaps an image of the asset or a sensor of the asset). The status information may include at least one of: sensor data obtained from the asset, surface reconstruction data for the asset, LIDAR data for the asset, or even image data for the asset.

Service 205 feeds the tracked status information used by the bitemporal modeling to an ML model. The ML model, during a first training stage, is trained to detect anomalies with respect to at least one of the uptime or the downtime of the asset and to generate predictions regarding uptimes and downtimes. The ML model can determine a standard operating range for the asset. The ML model can also determine whether the tracked status information includes data representative of anomalous behavior for the asset.

Service 205 then causes the ML model (e.g., the LLM agent) to generate a prediction regarding a future uptime or a future downtime of the asset. The future uptime or the future downtime is predicted for a given range of time that is to subsequently transpire. Optionally, the prediction includes a recommendation generated by the ML model. The recommendation may include a recommended maintenance event for the asset. The recommendation may include a recommended part replacement event.

Subsequently, service 205 collects data reflecting an actual uptime or an actual downtime of the asset during the given range of time. The collection of this data can be performed using sensor data, user input, and so on.

Service 205 compares the ML model's prediction of the future uptime or the future downtime of the asset with the data reflecting the actual uptime or the actual downtime of the asset during the given range of time. In some cases, comparing the ML model's prediction with the data includes overlaying data corresponding to the prediction onto the data reflecting the actual uptime or the actual downtime onto a common plot and then identifying deviations. Optionally, the comparison of the ML model's prediction with the data includes performing one or more data slicing actions on the ML model's prediction and/or the data, resulting in a modified data set.

Service 205 further trains the ML model based on the comparison, or, alternatively, further instructs the LLM agent via a new prompt provided to the LLM agent or via feedback received automatically by the LLM agent. As a result, the ML model is subjected to a second training stage to correct for discrepancies between the ML model's prediction of the future uptime or the future downtime of the asset and the data reflecting the actual uptime or the actual downtime of the asset.

Optionally, the ML model may be further trained, during the second training stage, (or, alternative, the LLM agent may be further instructed) in an attempt to reduce false positives as to whether operations of the asset conform with a set of governing criteria. As another option, the ML model may be further configured to analyze multiple, disparate sets of data and to identify relationships between those multiple, disparate sets of data. The ML model can also be further configured to analyze (i) a procedure for the asset, (ii) image data of the asset, and (iii) sensor data for the asset. The ML model may then identify one or more relationships between the procedure, the image data, and the sensor data. It should be noted how references to the ML model can be applied to the LLM agent.

The ML model can track when the asset operates outside of an established range. The ML model can then determine a reason as to why the asset is operating outside of the established range. Optionally, the ML model is further configured to perform optical character recognition (OCR) on a procedure for the asset. The OCR may identify a particular characteristic for the asset. The ML model may then acquire sensor data for the asset, where the sensor data relates to the particular characteristic of the asset. The ML model may then generate a relationship between the particular characteristic identified from performing the OCR and the acquired sensor data.

Figure 16:
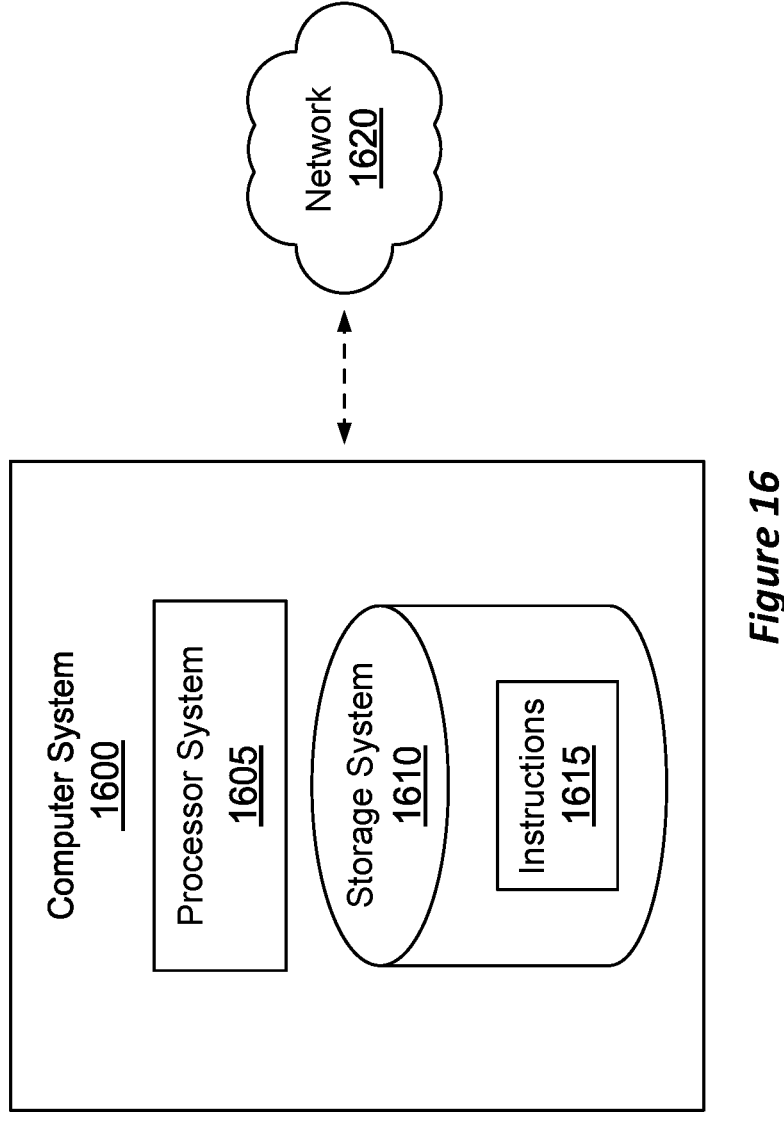
FIG. 16 illustrates an example computer system that can be configured to perform any of the disclosed operations.

Attention will now be directed to FIG. 16 which illustrates an example computer system 1600 that may include and/or be used to perform any of the operations described herein. Computer system 1600 may take various different forms. For example, computer system 1600 may be embodied as a tablet, a desktop, a laptop, a mobile device, or a standalone device, such as those described throughout this disclosure. Computer system 1600 may also be a distributed system that includes one or more connected computing components/devices that are in communication with computer system 1600.

In its most basic configuration, computer system 1600 includes various different components. FIG. 16 shows that computer system 1600 includes a processor system 1605 that includes one or more processor(s) (aka a "hardware processing unit") and a storage system 1610.

Regarding the processor(s) of the processor system 1605, it will be appreciated that the functionality described herein can be performed, at least in part, by one or more hardware logic components (e.g., the processor(s)). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1600. The different components, modules, engines, and services described herein may be implemented as objects or processors that execute on computer system 1600 (e.g. as separate threads).

Storage system 1610 may be physical system memory, which may be volatile, non-volatile, or some combination of the two. The term "memory" may also be used herein to refer to non-volatile mass storage such as physical storage media. If computer system 1600 is distributed, the processing, memory, and/or storage capability may be distributed as well.

Storage system 1610 is shown as including executable instructions 1615. The executable instructions 1615 represent instructions that are executable by the processor(s) of the processor system 1605 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1600 may also be connected (via a wired or wireless connection) to external sensors (e.g., one or more remote cameras) or devices via a network 1620. For example, computer system 1600 can communicate with any number of devices or cloud services to obtain or process data. In some cases, network 1620 may itself be a cloud network. Furthermore, computer system 1600 may also be connected through one or more wired or wireless networks to remote/separate computer systems(s) that are configured to perform any of the processing described with regard to computer system 1600.

A "network," like network 1620, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1600 will include one or more communication channels that are used to communicate with the network 1620. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for using a machine learning (ML) model to predict a state of an asset, the method comprising:

using bitemporal modeling to track status information of an asset, wherein the status information includes at least one of an uptime or a downtime of the asset, and wherein the bitemporal modeling includes a first record associated with a current state of the asset's status information and a second record associated with the asset's status information at a selected point in time earlier than the current state;

feeding the tracked status information used by the bitemporal modeling to an ML model, wherein the ML model, during a first training stage, is trained to detect anomalies with respect to at least one of the uptime or the downtime of the asset and to generate predictions regarding uptimes and downtimes;

causing the ML model to generate a prediction regarding a future uptime or a future downtime of the asset, the future uptime or the future downtime being predicted for a given range of time that is to subsequently transpire;

subsequently, collecting data reflecting an actual uptime or an actual downtime of the asset during the given range of time;

comparing the ML model's prediction of the future uptime or the future downtime of the asset with the data reflecting the actual uptime or the actual downtime of the asset during the given range of time;

further training the ML model based on said comparison, such that the ML model is subjected to a second training stage to correct for discrepancies between the ML model's prediction of the future uptime or the future downtime of the asset and the data reflecting the actual uptime or the actual downtime of the asset;

using the trained ML model to identify at least one of: a trend and a pattern;

generating an updated package based on the identified at least one of: a trend and a pattern, wherein the updated package includes updated information on at least one of: operation, maintenance, and use of an asset; and causing the updated package to be installed on the asset to change operational behavior of the asset to reflect contents of the updated package.

2. The method of claim 1, wherein the bitemporal modeling provides an auditable log for the asset.

3. The method of claim 1, wherein the status information is obtained from a plurality of different sources, including at least one text source and at least one image source.

4. The method of claim 1, wherein the ML model determines a standard operating range for the asset, and wherein the ML model determines whether the tracked status information includes data representative of anomalous behavior for the asset.

5. The method of claim 1, wherein the prediction includes a recommendation generated by the ML model, the recommendation including a recommended maintenance event for the asset.

6. The method of claim 1, wherein the prediction includes a recommendation by the ML model, the recommendation including a recommended part replacement event.

7. The method of claim 1, wherein the status information includes at least one of: sensor data obtained from the asset, surface reconstruction data for the asset, LIDAR data for the asset, or image data for the asset.

8. The method of claim 1, further comprising rendering a custom view on a user interface, wherein the custom view is based at least in part on the identified at least one of: a trend and a pattern.

9. A computer system that uses a machine learning (ML) model to predict a state of an asset, the computer system comprising:

a processor system; and a storage system that stores instructions that are executable by the processor system to cause the computer system to:

use bitemporal modeling to track status information of an asset, wherein the status information includes at least one of an uptime or a downtime of the asset, and wherein the bitemporal modeling includes a first record associated with a current state of the asset's status information and a second record associated with the asset's status information at a selected point in time earlier than the current state;

feed the tracked status information used by the bitemporal modeling to the ML model, which is trained to detect anomalies with respect to at least one of the uptime or the downtime of the asset;

cause the ML model to generate a prediction regarding a future uptime or a future downtime of the asset, the future uptime or the future downtime being predicted for a given range of time that is to subsequently transpire;

subsequently, collect data reflecting an actual uptime or an actual downtime of the asset during the given range of time;

compare the ML model's prediction of the future uptime or the future downtime of the asset with the data reflecting the actual uptime or the actual downtime of the asset during the given range of time;

further train ML model based on said comparison, such that the ML model is further instructed to correct for discrepancies between the ML model's prediction of the future uptime or the future downtime of the asset and the data reflecting the actual uptime or the actual downtime of the asset;

using the trained ML model to identify at least one of: a trend and a pattern; and generating an updated package based on the identified at least one of: a trend and a pattern, wherein the updated package includes updated information on at least one of: operation, maintenance, and use of an asset; and causing the updated package to be installed on the asset to change operational behavior of the asset to reflect contents of the updated package.

10. The computer system of claim 9, wherein the ML model is further instructed in an attempt to reduce false positives as to whether operations of the asset conform with a set of governing criteria.

11. The computer system of claim 9, wherein the ML model is further configured to analyze multiple, disparate sets of data and to identify relationships between those multiple, disparate sets of data.

12. The computer system of claim 9, wherein the ML model is further configured to analyze (i) a procedure for the asset, (ii) image data of the asset, and (iii) sensor data for the asset, and wherein the ML model identifies one or more relationships between the procedure, the image data, and the sensor data.

13. The computer system of claim 9, wherein comparing the ML model's prediction with the data includes overlaying data corresponding to the prediction onto the data reflecting the actual uptime or the actual downtime onto a common plot and then identifying deviations.

14. The computer system of claim 9, wherein comparing the ML model's prediction with the data includes performing one or more data slicing actions on the ML model's prediction and/or the data, resulting in a modified data set.

15. The computer system of claim 9, wherein the ML model tracks when the asset operates outside of an established range, and wherein the ML model determines a reason as to why the asset is operating outside of the established range.

16. The computer system of claim 9, wherein the status information of the asset is obtained from one or more of the following: image data, computer vision data, graph data, or telemetry data.

17. The computer system of claim 9, wherein the ML model is further configured to:

perform optical character recognition (OCR) on a procedure for the asset, wherein the OCR identifies a particular characteristic for the asset;

acquire sensor data for the asset, wherein the sensor data relates to the particular characteristic of the asset; and generate a relationship between the particular characteristic identified from performing the OCR and the acquired sensor data.

18. A method for using a machine learning (ML) model to predict a state of an asset, the method comprising:

using bitemporal modeling to track status information of an asset, wherein the status information includes at least one of an uptime or a downtime of the asset, and wherein the bitemporal modeling includes a first record associated with a current state of the asset's status information and a second record associated with the asset's status information at a selected point in time earlier than the current state;

feeding the tracked status information used by the bitemporal modeling to an ML model, wherein the ML model, during a first training stage, is trained to detect anomalies with respect to at least one of the uptime or the downtime of the asset;

causing the ML model to generate a prediction regarding a future uptime or a future downtime of the asset, the future uptime or the future downtime being predicted for a given range of time that is to subsequently transpire;

subsequently during the given range of time, collecting data reflecting an actual uptime or an actual downtime of the asset during the given range of time, wherein the collected data includes sensor data obtained for the asset;

comparing the ML model's prediction of the future uptime or the future downtime of the asset with the data reflecting the actual uptime or the actual downtime of the asset during the given range of time, wherein said comparing is performed using a chart that identifies deviations between the actual uptime or the actual downtime and the predicted further uptime or the predicted further downtime;

further training the ML model based on said comparison, such that the ML model is subjected to a second training stage to correct for the deviations between the ML model's prediction of the future uptime or the future downtime of the asset and the data reflecting the actual uptime or the actual downtime of the asset;

using the trained ML model to identify at least one of: a trend and a pattern; and generating an updated package based on the identified at least one of: a trend and a pattern, wherein the updated package includes updated information on at least one of: operation, maintenance, and use of an asset; and causing the updated package to be installed on the asset to change operational behavior of the asset to reflect contents of the updated package.

19. The method of claim 18, wherein the bitemporal modeling provides an auditable log for the asset, and wherein the status information is obtained from a plurality of different sources.

20. The method of claim 18, wherein the ML model determines a standard operating range for the asset, and wherein the ML model determines whether the tracked status information includes data representative of anomalous behavior for the asset.

21. The method of claim 18, wherein the prediction includes a recommendation generated by the ML model, the recommendation including a recommended maintenance event for the asset.

* * * * *